United States Patent
Thomas et al.

(10) Patent No.: US 9,161,241 B2
(45) Date of Patent: Oct. 13, 2015

(54) REFERENCE SIGNAL DESIGN AND SIGNALING FOR PER-USER ELEVATION MIMO

(71) Applicant: Nokia Siemens Networks Oy, Espoo (FI)

(72) Inventors: Timothy A. Thomas, Palatine, IL (US); Frederick W. Vook, Schaumburg, IL (US); Bishwarup Mondal, Schaumburg, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 223 days.

(21) Appl. No.: 13/853,294

(22) Filed: Mar. 29, 2013

(65) Prior Publication Data

US 2013/0272151 A1     Oct. 17, 2013

Related U.S. Application Data

(60) Provisional application No. 61/617,894, filed on Mar. 30, 2012.

(51) Int. Cl.
| | |
|---|---|
| *H04W 24/02* | (2009.01) |
| *H04B 7/04* | (2006.01) |
| *H04B 7/06* | (2006.01) |
| *H04L 5/00* | (2006.01) |

(52) U.S. Cl.
CPC .............. *H04W 24/02* (2013.01); *H04B 7/046* (2013.01); *H04B 7/0643* (2013.01); *H04L 5/0091* (2013.01); *H04B 7/0469* (2013.01); *H04L 5/0048* (2013.01)

(58) Field of Classification Search
CPC .... H04B 7/046; H04B 7/0469; H04B 7/0486; H04B 7/063; H04B 7/0634; H04L 25/03949; H04L 27/26; H04L 5/00
USPC .................. 370/252, 254, 329, 330; 455/450
See application file for complete search history.

(56) References Cited

U.S. PATENT DOCUMENTS

| | | | | |
|---|---|---|---|---|
| 7,446,601 | B2 * | 11/2008 | LeChevalier | 330/4.7 |
| 7,450,066 | B2 | 11/2008 | Haskell | 342/368 |
| 7,658,713 | B2 * | 2/2010 | Barnes et al. | 600/437 |
| 7,722,541 | B2 * | 5/2010 | Cai | 600/447 |

(Continued)

OTHER PUBLICATIONS

Y. Zhang; et al., "Extension of 4-Tx Precoding Codebook to 8-Tx Downlink Closed-Loop MIMO", IEEE 2011, 4 pgs.

(Continued)

*Primary Examiner* — Edan Orgad
*Assistant Examiner* — Emmanuel Maglo
(74) *Attorney, Agent, or Firm* — Harrington & Smith

(57) ABSTRACT

A method to use RSs for per-user elevation beamforming is described. An eNB sends, to a UE, an indication of which RSs in a plurality of RSs sound in the elevation dimension and which RSs in the plurality of RSs sound in the azimuthal dimension. Then, the eNB sends, to the UE, the plurality of RSs using a plurality of antenna. The UE separates the plurality of RSs into the first portion and the second portion based at least in part on the indication and sends elevation and azimuthal feedback based on the received RSs to the eNB. The eNB determines beamforming weights for the plurality of antenna based at least in part on the elevation feedback and the azimuthal feedback. Apparatus and computer readable media are also described.

20 Claims, 13 Drawing Sheets

(56) References Cited

U.S. PATENT DOCUMENTS

| | | | | |
|---|---|---|---|---|
| 8,041,395 | B2 | 10/2011 | Lo et al. | 455/562.1 |
| 8,510,433 | B2* | 8/2013 | Ramachandran et al. | 709/224 |
| 8,831,125 | B2* | 9/2014 | Wernersson et al. | 375/267 |
| 2002/0159506 | A1 | 10/2002 | Alamouti et al. | 375/147 |
| 2006/0035643 | A1* | 2/2006 | Vook et al. | 455/450 |
| 2010/0158151 | A1* | 6/2010 | Krauss et al. | 375/267 |
| 2013/0229980 | A1* | 9/2013 | Wernersson et al. | 370/328 |
| 2013/0258964 | A1* | 10/2013 | Nam et al. | 370/329 |
| 2013/0259151 | A1* | 10/2013 | Thomas et al. | 375/267 |

OTHER PUBLICATIONS

Y. Cheng, et al., "A Scalable Limited Feedback Design for Network MIMO using Per-Cell Product Codebook", IEEE Transactions on wireless Communications, vol. 9, No. 10, Oct. 2010, 15 pgs.

O. Yilmaz, et al., "System Level Analysis of vertical Sectorization for 3GPP LTE", IEEE 2009, pp. 453-457.

R1-111436, "Channel modeling considerations for vertical beamforming", Alcatel-Lucent Shanghai Bell,, Alcatel-Lucent, 3GPP TSG RAN WG1 Meeting RAN1#65, May 2011, 3 pgs.

Alcatel-Lucent Shanghai Bell et al: "Considerations on CSI feedback enhancements for high-priority antenna configurations"; 3GPP Draft; R1-112420; 3rd Generation Partnership Project (3GPP); Mobile Competence Centre; 650, Route des Lucioles; F-06921 Sophia-Antipolis Cedex; France; vol. RAN WG1, no. Athens, Greece; 20110822, Aug. 18, 2011, XP050537814, [retrieved on Aug. 18, 2011], (7 pages).

Huawei: "CSI-RS Pattern Design"; 3GPP Draft; R1-104204; 3rd Generation Partnership Project (3GPP); Mobile Competence Centre; 650, Route des Lucioles; F-06921 Sophia-Antipolis Cedex; France; vol. RAN WG1, no. Dresden, Germany; 20100628, Jul. 5, 2010, XP050449621, [retrieved on Jul. 5, 2010], (12 pages).

3GPP: "3rd Generation Partnership Project; Technical Specification Group Radio Access Network; Evolved Universal Terrestrial Radio Access (E-UTRA); Radio Resource Control (RRC); Protocol specification (Release 10)"; (Apr. 5, 2011), (288 pages).

3GPP TS 36.300 V8.12.0 (Mar. 2010) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; (149 pages).

3GPP TS 36.300 V9.9.0 (Dec. 2011) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", (174 pages).

3GPP TS 36.300 V10.6.0 (Dec. 2011) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); (194 pages).

3GPP TS 36.300 V11.0.0 (Dec. 2011) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; (194 pages).

3GPP TR 36.913 V8.0.1 (Mar. 2009) "3rd Generation Partnership Project; Technical Specification Group Radio Access Network; Requirements for further advancements for Evolved Universal Terrestrial Radio Access (E-UTRA) (LTE-Advanced) (Release 8)"; (15 pages).

3GPP TR 36.913 V9.0.0 (Dec. 2009) "3rd Generation Partnership Project; Technical Specification Group Radio Access Network; Requirements for further advancements for Evolved Universal Terrestrial Radio Access (E-UTRA) (LTE-Advanced) (Release 9)"; (15 pages).

3GPP TR 36.913 V10.0.0 (Mar. 2011) "3rd Generation Partnership Project; Technical Specification Group Radio Access Network; Requirements for further advancements for Evolved Universal Terrestrial Radio Access (E-UTRA) (LTE-Advanced) (Release 10)"; (15 pages).

* cited by examiner

REFERENCE SIGNAL DESIGN AND SIGNALING FOR PER-USER ELEVATION MIMO

CROSS-REFERENCE TO RELATED APPLICATIONS

This patent application claims priority under 35 U.S.C. §119(e) from U.S. Provisional Patent Application No. 61/617,894, filed Mar. 30, 2012, the disclosure of which is incorporated by reference herein in its entirety.

TECHNICAL FIELD

The exemplary and non-limiting embodiments of this invention relate generally to wireless communication systems, methods, devices and computer programs and, more specifically, relate to reference signal design for per-user elevation beamforming.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BF beamforming
BS base station
BW bandwidth
CDM code division multiplexing
CRS common reference signal
CDD cyclic delay diversity
CSD cyclic shift diversity
CSI channel state information
CSTD cyclic shift time diversity
DL downlink (eNB towards UE)
eNB E-UTRAN Node B (evolved Node B)
EPC evolved packet core
E-UTRAN evolved UTRAN (LTE)
FDD frequency division duplex
HARQ hybrid automatic repeat request
IMT-A international mobile telephony-advanced
ITU international telecommunication union
ITU-R ITU radiocommunication sector
LTE long term evolution of UTRAN (E-UTRAN)
MAC medium access control (layer 2, L2)
MM/MME mobility management/mobility management entity
Node B base station
O&M operations and maintenance
OFDMA orthogonal frequency division multiple access
PDCP packet data convergence protocol
PHY physical (layer 1, L1)
PMI precoder matrix index
PRB physical resource block
RF radio frequency
RLC radio link control
RRC radio resource control
RRM radio resource management
RX receiver
SC-FDMA single carrier, frequency division multiple access
S-GW serving gateway
SNR signal to noise ratio
SRS sounding reference signal
TDD time division duplex
TX transmitter
UE user equipment, such as a mobile station or mobile terminal
UL uplink (UE towards eNB)
UTRAN universal terrestrial radio access network
XPol cross polarized The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300. V8.12.0 (2010-04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.9.0 (2011-12), incorporated by reference herein in its entirety, and Release 10 versions of at least some of these specifications have been published including 3GPP TS 36.300, V10.6.0 (2011-12), incorporated by reference herein in its entirety. Even more recently, Release 11 versions of at least some of these specifications have been published including 3GPP TS 36.300, V11.0.0 (2011-12), incorporated by reference herein in its entirety.

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
  functions for RRM: Radio Bearer Control, Radio Admission Control, Connection Mobility Control. Dynamic allocation of resources to UEs in both UL and DL (scheduling);
  IP header compression and encryption of the user data stream;
  selection of a MME at UE attachment;
  routing of User Plane data towards the Serving Gateway;
  scheduling and transmission of paging messages (originated from the MME);
  scheduling and transmission of broadcast information (originated from the MME or O&M); and
  a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009 03), 3rd Generation Partnership Project; Technical Specification Group Radio Access Network; Requirements for Further Advancements for E UTRA (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A will most likely be part of LTE Rel-10. LTE-A will be a more optimized radio system fulfilling the ITU-R requirements for IMT-A while maintaining backward compatibility with LTE Rel-8. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety.

Typical antenna deployments consist of an array of horizontally arranged antenna elements that are processed for adaptivity in the azimuth dimension. Recent architectures have been proposed for creating arrays that effectively consist of antenna elements arranged both vertically and horizontally, which therefore promise the ability to adapt in both azimuth and elevation dimensions.

The traditional systems are limited to feedback methods which do not need to know ports (antennas) are for azimuth and which are for elevation. Hence, CSI operation is inefficient due to the possibility that a large number of ports need to be sounded on all CSI-RS (or common RS) intervals. Also the total number of ports is limited by the current LTE standard (e.g., to 8). Additionally traditional systems cannot take advantage of different feedback intervals for azimuth and elevation (e.g., elevation feedback might be able to be sent less frequently than azimuth).

Many traditional systems focus on sector-specific vertical beamforming. For example, a traditional system may use the uplink of an FDD system to determine an elevation beamformer. However, this does not enable direct measurement of the elevation channel by the UE. Additionally, calibration and complex mapping between different uplink and downlink channels may be required.

Traditional pilot designs (e.g., LTE, 802.11, 802.16) are concerned with sending pilots from generic ports. Therefore, feedback cannot be tailored to elevation beamforming in addition to azimuth beamforming. This prevents efficient pilot design (e.g., traditional designs may need a complicated 12 port format). Furthermore, such pilot designs do not provide support for legacy devices.

What is needed is a technique that allows the UE to measure the azimuth and elevation channels on the downlink to facilitate both azimuth and elevation feedback.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment provides a method to design reference signals for per-user elevation beamforming. The method includes receiving, an indication of which RSs in a plurality of RSs sound in the elevation dimension and which RSs in the plurality of RSs sound in the azimuthal dimension. The method includes receiving the plurality of RSs from a transmit antenna array and separating the plurality of RSs into the first portion and the second portion based at least in part on the indication. The method also includes sending elevation feedback and azimuthal feedback to the eNB.

In another aspect thereof an exemplary embodiment provides a method to design reference signals for per-user elevation beamforming. The method includes sending, from an eNB, an indication of which RSs in a plurality of RSs sound in the elevation dimension and which RSs in the plurality of RSs sound in the azimuthal dimension. The method includes sending, from the eNB, the plurality of RSs using a plurality of antennas and receiving elevation feedback and azimuthal feedback at the eNB. The method also includes determining beamforming weights for the plurality of antennas based at least in part on the elevation feedback and the azimuthal feedback.

In further aspect thereof an exemplary embodiment provides a method to send reference signals for per-user elevation beamforming. The method includes sending, at a first time, RSs in a plurality of RSs which sound in an azimuthal dimension using a first portion of the plurality of antennas. The method also includes sending, at a second time, RSs in the plurality of RSs which sound in an elevation dimension using a second portion of the plurality of antenna.

In another aspect thereof an exemplary embodiment provides an apparatus to design reference signals for per-user elevation beamforming. The apparatus includes at least one processor and at least one memory storing computer program code. The at least one memory and the computer program code are configured to, with the at least one processor, cause the apparatus to perform actions. The actions include to receive an indication of which RSs in a plurality of RSs sound in the elevation dimension and which RSs in the plurality of RSs sound in the azimuthal dimension. The actions include to receive the plurality of RSs from a transmit antenna array and to separate the plurality of RSs into the first portion and the second portion based at least in part on the indication. The actions also include to send elevation feedback and azimuthal feedback to the eNB.

In further aspect thereof an exemplary embodiment provides an apparatus to design reference signals for per-user elevation beamforming. The apparatus includes at least one processor and at least one memory storing computer program code. The at least one memory and the computer program code are configured to, with the at least one processor, cause the apparatus to perform actions. The actions include to send, from an eNB, an indication of which RSs in a plurality of RSs sound in the elevation dimension and which RSs in the plurality of RSs sound in the azimuthal dimension. The actions include to send, from the eNB the plurality of RSs using a plurality of antenna and to receive elevation feedback and azimuthal feedback at the eNB. The actions also include to determine beamforming weights for the plurality of antennas based at least in part on the elevation feedback and the azimuthal feedback.

In another aspect thereof an exemplary embodiment provides an apparatus to send reference signals for per-user elevation beamforming. The apparatus includes at least one processor and at least one memory storing computer program code. The at least one memory and the computer program code are configured to, with the at least one processor, cause the apparatus to perform actions. The actions include to send, at a first time, RSs in a plurality of RSs which sound in an azimuthal dimension using a first portion of the plurality of antennas. The actions also include to send, at a second time, RSs in the plurality of RSs which sound in an elevation dimension using a second portion of the plurality of antenna.

In further aspect thereof an exemplary embodiment provides a computer readable medium to design reference signals for per-user elevation beamforming. The computer readable medium is tangibly encoded with a computer program executable by a processor to perform actions. The actions include receiving an indication of which RSs in a plurality of RSs sound in the elevation dimension and which RSs in the plurality of RSs sound in the azimuthal dimension. The actions include receiving the plurality of RSs from a transmit antenna array and separating the plurality of RSs into the first portion and the second portion based at least in part on the indication. The actions also include sending elevation feedback and azimuthal feedback to the eNB.

In another aspect thereof an exemplary embodiment provides a computer readable medium to design reference signals for per-user elevation beamforming. The computer readable medium is tangibly encoded with a computer program executable by a processor to perform actions. The actions include sending, from an eNB, an indication of which RSs in a plurality of RSs sound in the elevation dimension and which RSs in the plurality of RSs sound in the azimuthal dimension. The actions include sending, from the eNB, the plurality of RSs using a plurality of antennas and receiving elevation feedback and azimuthal feedback at the eNB. The actions also include determining beamforming weights for the plurality of antennas based at least in part on the elevation feedback and the azimuthal feedback.

In further aspect thereof an exemplary embodiment provides a computer readable medium to send reference signals for per-user elevation beamforming. The computer readable medium is tangibly encoded with a computer program executable by a processor to perform actions. The actions include sending, at a first time, RSs in a plurality of RSs which sound in an azimuthal dimension using a first portion of the plurality of antenna. The actions also include sending, at a second time. RSs in the plurality of RSs which sound in an elevation dimension using a second portion of the plurality of antennas.

In another aspect thereof an exemplary embodiment provides an apparatus to design reference signals for per-user elevation beamforming. The apparatus includes means for receiving (such as a receiver) an indication of which RSs in a plurality of RSs sound in the elevation dimension and which RSs in the plurality of RSs sound in the azimuthal dimension. The apparatus includes means for receiving (such as a receiver) the plurality of RSs from a transmit antenna array and means for separating (such as a processor) the plurality of RSs into the first portion and the second portion based at least in part on the indication. The apparatus also includes means for sending (such as a transmitter) elevation feedback and azimuthal feedback to the eNB.

In further aspect thereof an exemplary embodiment provides an apparatus to design reference signals for per-user elevation beamforming. The apparatus includes means for sending (such as a transmitter), from an eNB, an indication of which RSs in a plurality of RSs sound in the elevation dimension and which RSs in the plurality of RSs sound in the azimuthal dimension. The apparatus includes means for sending (such as a transmitter), from the eNB, the plurality of RSs using a plurality of antenna and means for receiving (such as a receiver) elevation feedback and azimuthal feedback at the eNB. The apparatus also includes means for determining (such as a processor) beamforming weights for the plurality of antenna based at least in part on the elevation feedback and the azimuthal feedback.

In another aspect thereof an exemplary embodiment provides an apparatus to send reference signals for per-user elevation beamforming. The apparatus includes means for sending (such as a transmitter), at a first time. RSs in a plurality of RSs which sound in an azimuthal dimension using a first portion of the plurality of antenna. The apparatus also includes means for sending (such as a transmitter), at a second time, RSs in the plurality of RSs which sound in an elevation dimension using a second portion of the plurality of antenna.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention address how to signal and send reference symbols that enable a UE to determine feedback which is both azimuth and elevation specific. Reference signal (RS) design and signaling methods enable the UE to measure the downlink channel in both elevation and azimuth for the purposes of channel state information feedback. This allows per user beamforming to be determined based on the UE feedback. Accordingly, cell edge users may receive improved data rates from the beamforming/MIMO. Additionally, per-user vertical beamforming can yield higher performance for the users than a Vertical sector beamforming.

Furthermore, an efficient CSI-RS design may be used to reduce overhead requirements. Using the design techniques, fewer pilot sequences may be used. For example, a use of E+M pilot sequences using the efficient CSI-RS design compared to a traditional set of E×M pilot sequences.

Figure 2:
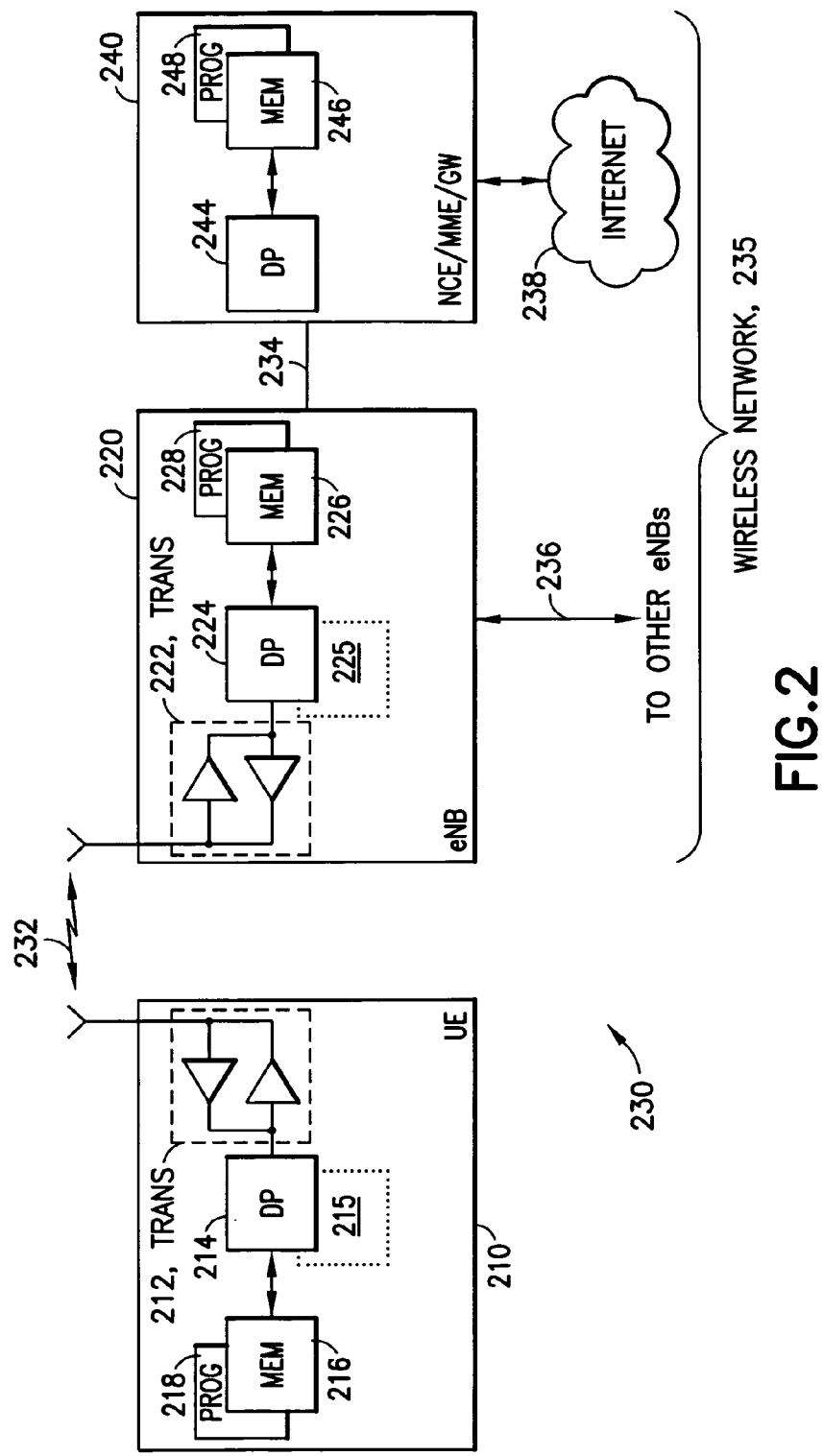
FIG. 2 shows a simplified block diagram of exemplary electronic devices that are suitable for use in practicing various exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

Figure 1:
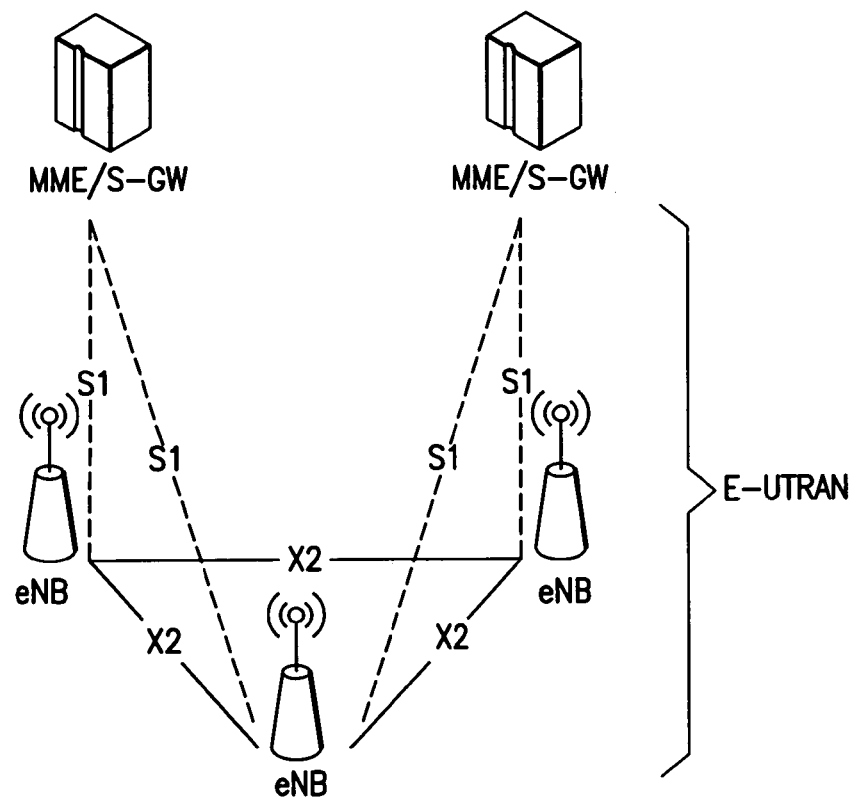
FIG. 1 reproduces FIG. 4-1 of 3GPP TS 36.300, and shows the overall architecture of the E UTRAN system.

In the wireless system 230 of FIG. 2, a wireless network 235 is adapted for communication over a wireless link 232 with an apparatus, such as a mobile communication device which may be referred to as a UE 210, via a network access node, such as a Node B (base station), and more specifically an eNB 220. The network 235 may include a network control element (NCE) 240 that may include the MME/SGW functionality shown in FIG. 1, and which provides connectivity with a network, such as a telephone network and/or a data communications network (e.g., the internet 238).

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 214 of the UE 210; by the DP 224 of the eNB 220; and/or by the DP 244 of the NCE 240, or by hardware, or by a combination of software and hardware (and firmware).

The UE 210 and the eNB 220 may also include dedicated processors, for example RS processor 215 and RS processor 225.

In general, the various embodiments of the UE 210 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g. RF transceivers 212 and 222) may be of any type suitable to the local technical environment and may be implemented using any suitable communication technology such as individual transmitters, receivers, transceivers or a combination of such components.

Figure 3:
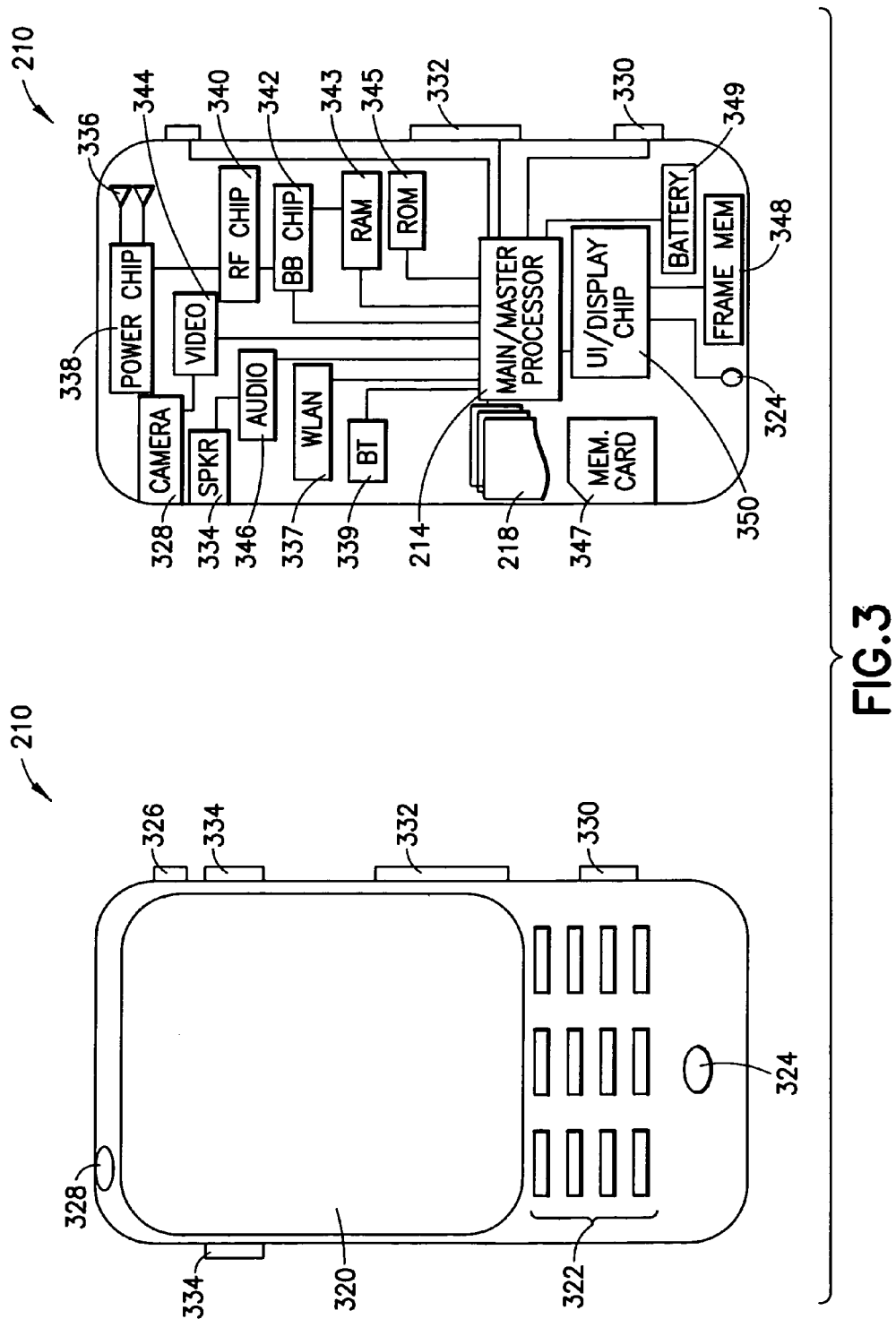
FIG. 3 shows a more particularized block diagram of an exemplary user equipment such as that shown at FIG. 2.

FIG. 3 illustrates further detail of an exemplary UE in both plan view (left) and sectional view (right), and the invention may be embodied in one or some combination of those more function-specific components. At FIG. 3 the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (e.g. for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 3 are seen multiple transmit/receive antennas 336 that are typically used for cellular communication. The antennas 336 may be multi-band for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 are stored in one or more of these memories. All of these components within the UE 210 are normally powered by a portable power supply such as a battery 349.

Processors 338, 340, 342, 344, 346, 350, if embodied as separate entities in a UE 210 or eNB 220, may operate in a slave relationship to the main processor 214, 224, which may then be in a master relationship to them. Embodiments of this invention are most relevant to the RS processor 215 and RS processor 225, though it is noted that other embodiments need not be disposed there but may be disposed across various chips and memories as shown or disposed within another processor that combines some of the functions described above for FIG. 3. Any or all of these various processors of FIG. 3 access one or more of the various memories, which may be on-chip with the processor or separate therefrom. Similar function-specific components that are directed toward communications over a network broader than a piconet (e.g., components 336, 338, 340, 342-345 and 347) may also be disposed in exemplary embodiments of the access node 220, which may have an array of tower-mounted antennas rather than the two shown at FIG. 3.

Note that the various chips (e.g., 338, 340, 342, etc.) that were described above may be combined into a fewer number than described and, in a most compact case, may all be embodied physically within a single chip.

In traditional systems, LTE common reference symbols (CRS) can only sound up to 4 ports (antenna). The UE would not know which ports are used for elevation and which are for azimuth. Alternatively. LTE channel state information reference symbols, such as (CSI)-RS, may be limited to 8 ports. Again the UE would not know which ports are for elevation and which are for azimuth.

Figure 4:
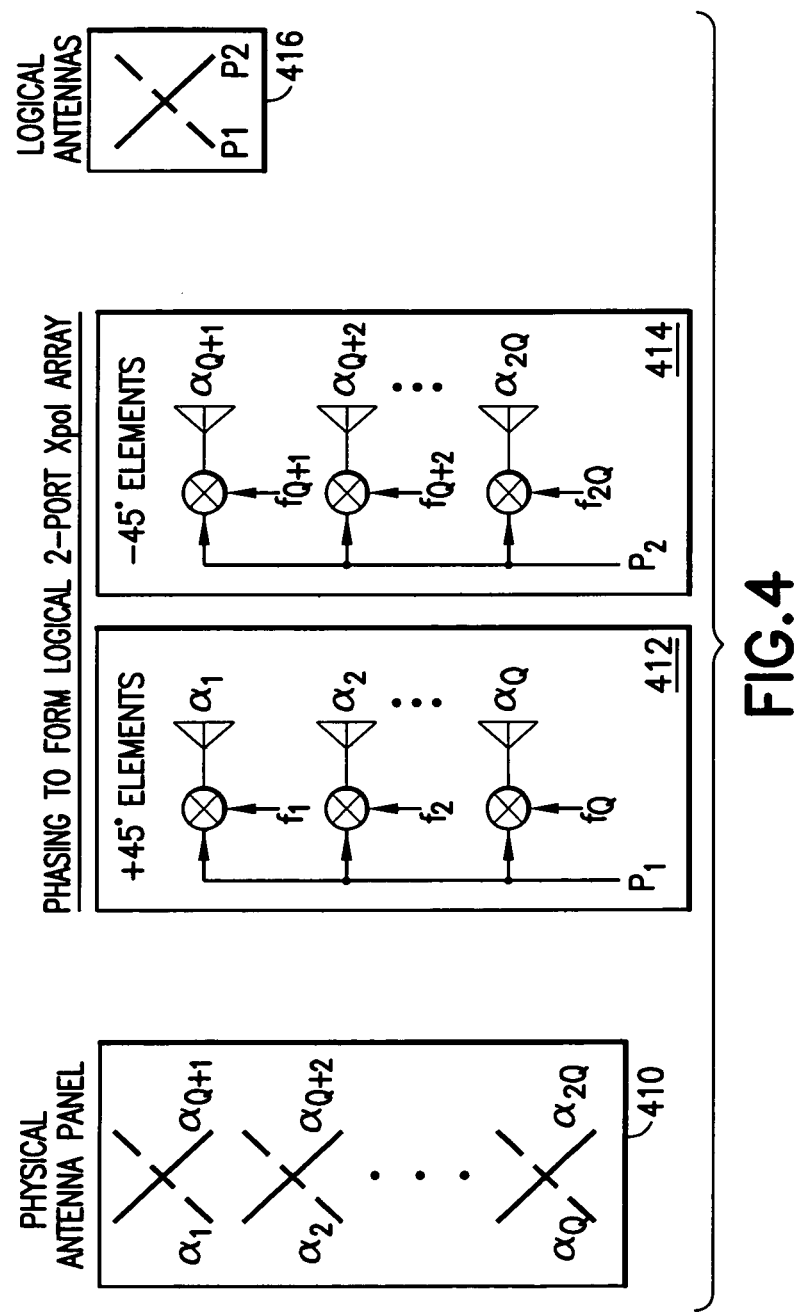
FIG. 4 provides an overview of a conventional antenna panel design.

FIG. 4 provides an overview of a conventional antenna panel design. A physical XPOL Antenna Panel 410 is typically comprised of multiple +45' antenna sub-elements (shown with dashed lines) and multiple −45° antenna sub-elements (shown with solid lines). By +45° it is meant that the antenna sub-element transmits with a +45° diagonal polarization and by −45° it is meant that the antenna sub-element transmits with a −45° diagonal polarization. The +45° sub-elements are phased to form a logical +45° antenna 412 and the −45° sub-elements are phased to form a logical −45° antenna 414. The result is the set of logical antennas 416, one with +45° and the other with −45° polarization. When referring to azimuth ports or antennas, azimuth will refer to both polarization and also antenna elements spaced in the azimuth dimension.

A similar concept applies to a panel array containing co-pol (co-polarization) vertical elements (not shown). The phasing is intended to create a specific antenna pattern in the elevation dimension. The use of a mechanical downtilt can also be used to optimize cell coverage. The elevation pattern is typically very narrow in macrocells in order to increase the overall antenna gain and to cover the cell from a high tower.

Figure 5:
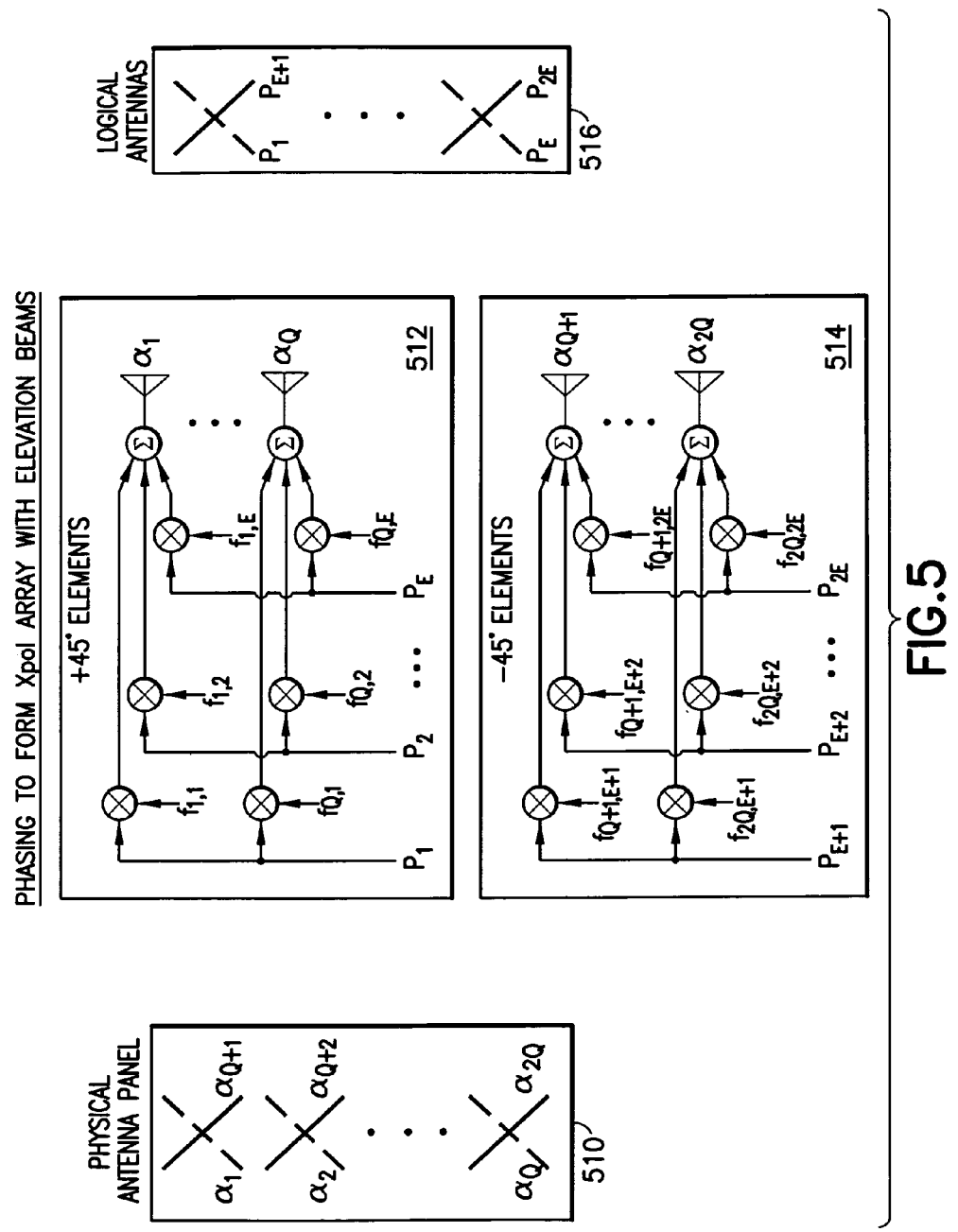
FIG. 5 is useful when explaining a method to achieve an elevational beamforming architecture and implementation.

FIG. 5 is useful when explaining a method to achieve an elevational beamforming architecture and implementation. In general, this involves creating multiple-beams per polarization via phasing of the co-pol sub-elements. In FIG. 5, each elevation beam for a given polarization is formed using all of the sub-elements of that polarization. Each panel contains some number of vertical elements for each of the two polarizations. The array at the eNB can then have multiple panels to provide elements in azimuth.

In the method there are 2Q total sub-elements in the panel with Q elements per polarization in the panel. The effect is to form E beams from the Q elements for each polarization, and the result is that the panel forms a logical E×2 vertical array of cross pols. Tx weights are applied to the inputs to the logical cross pols (e.g. ports $P_1 \ldots P_{2E}$) to beamform in the elevation dimension. The Tx weights that form the logical cross pol antennas (e.g., the weights $f_{11} \ldots f_{QE}$) may be applied at the radio frequency (RF) level (e.g., after upmixing), whereas the Tx weights that are applied to the input to the logical cross pol ports (not shown in the figure) may be applied at baseband.

In an FDD situation, the UE can provide CSI feedback for both the azimuth and elevation dimensions. This allows the transmission weights to be properly determined on a per user basis.

FIGS. 4-5 show structures to create an antenna panel array that logically consists of E vertical elements for each of two polarizations. e.g., for the XPOL case: +/−45. FIG. 4 shows a structure to create E=1 elevation beam and FIG. 5 can create E≥1 elevation beam. Other techniques can also be used to create an antenna architecture capable of supporting vertical beamforming. For example, one method is simply to arrange a set of physical cross pol elements in a two-dimensional layout that consist of M elements in azimuth and E elements in elevation.

As noted above, traditional techniques adapt the elevation pattern on a per-sector basis, not on a per-user basis and therefore contains no reference signal design and associated signaling aimed at per-user joint elevation/azimuth adaptivity. The per-user azimuth/elevation optimization enables a more tailored control of the elevation pattern to further optimize the link to a UE. Also, efficient reference signal structures can be defined which have significantly lower overhead than sounding all combinations of azimuth and elevation ports.

Figure 6:
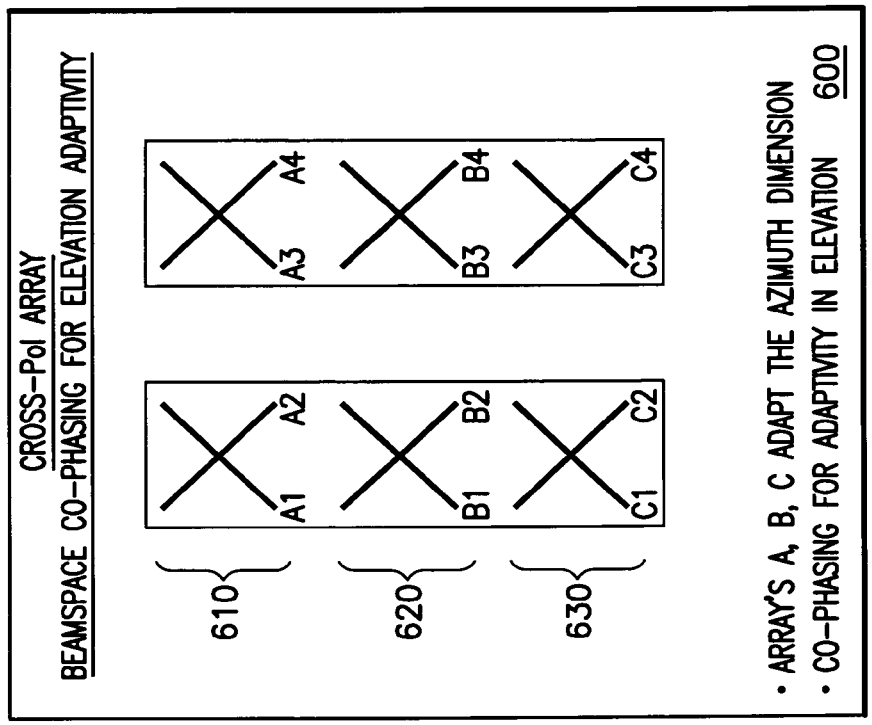
FIG. 6 provides an overview of an exemplary embodiment of a cross-pol array.

FIG. 6 provides an overview of an exemplary embodiment of a cross-pol array consisting of 3 rows of antennas where each row contains 4 antennas in azimuth. The 3 rows of antennas can be formed using beamspace co-phasing as shown in FIG. 5 and described earlier. Alternatively, the antenna structure shown in FIG. 6 could be formed from discrete antennas arranged as shown (three rows of antennas each containing two cross-pol pairs (4 antennas) for a total of 12 antennas). The overall logical array structure is partitioned into sub-arrays in elevation (e.g., 3 arrays: array A (antennas A1, A2, A3, A4), Array B (antennas B1, B2, B3, B4) and Array C (antennas C1 C2, C3, C4) for control of the elevation dimension) and also portioned into sub-arrays in the azimuth dimension (e.g., 4 arrays: array 1 (antennas A1, B1, C1), Array 2 (antennas A2, B2, C2), Array 3 (antennas A3, B3, C3), and Array 4 (antennas A4, B4, C4) for control of the azimuth dimension). This allows control of both azimuth (for example, using Arrays 1-4) and elevation (using arrays A-C)

at the eNB. The logical array structure may be extended for additional azimuthal ports (e.g., ports 0-7, etc.) and/or for additional elevation arrays.

CSI-RS can be designed to take advantage of antenna aggregation techniques that operate on multiple antennas and create the appearance to a receiver of a single transmit antenna. Example methods for antenna aggregation include but are not limited to cyclic shift diversity (CSD), cyclic delay diversity, cyclic shift time diversity, random precoding, or simple beamforming. For a two dimensional array such as the one shown in FIG. 6, antennas may be aggregated in the elevation dimension, where the antennas of a given column are aggregated together to form a single logical azimuth port (e.g., the antennas of sub array 1 (A1, B1, C1 are aggregated to form a single logical azimuth antenna; the antennas of sub array 2 (A2, B2, C2 are aggregated to form a single logical azimuth port, and so on.) A pilot signal may then be provided (transmitted) from each logical azimuthal port formed from the aggregation (4 logical azimuth ports are formed from aggregation in the elevation dimension in the example array of FIG. 6). Next, antennas may be aggregated in the azimuth dimension, where the antennas of a given row are aggregated together to form a single logical vertical antenna port. In the example array of FIG. 6, antennas A1, A2, A3, A4 are aggregated to form a single logical elevation antenna port; antennas B1, B2, B3, B4 are aggregated to form a single logical elevation antenna port; etc. A pilot signal may then be provided (transmitted) from each elevation port formed from the aggregation in azimuth. A UE may then use the pilot signals to determine CSI for the azimuthal and elevation dimensions. A legacy UE may measure azimuth CSI-RS for feedback using the azimuth pilots with elevation ports aggregated allowing the legacy UE to operate with the CSI-RS.

In the slot where the CSI-RS is defined, the eNB can sound (transmit pilots from) all azimuth antennas (e.g., the 4 ports, labeled 0-4) using antenna aggregation across the E elevation ports or the eNB can use a single sounding time, where the pilots are decimated by E in frequency over the current CSI-RS. The UE is informed of the number of azimuth and elevation antennas (likely signaled from eNB), where the CSI-RS is located in time, the antenna aggregation method used and the locations of the RSs (e.g., implicitly from a standard and the signaled number of antennas). The role of azimuth and elevation antennas can be switched (e.g., in a second sounding).

The pilot structure for aggregating elevation antennas with cyclic shift diversity may be defined in terms of an azimuth antenna, m, a subcarrier, k (including a subcarrier, $k_m$, which contains the RS for azimuth antenna m), a pilot sequence, x(k), which may be QPSK, an OFDM symbol number, t, an elevation beam, b, and a CSD shift value, $N_{CSD}$ (e.g., $N_{CSD}$=12E). When the CSD includes a large delay, the pilot structure may be given as:

$$p_{m,b}(k, t) = \begin{cases} 0 & k \neq k_m \\ (-1)^{mt}x(k)e^{-j2\pi k(b-1)/N_{CSD}} & \text{otherwise} \end{cases} \quad (1)$$

PMI feedback may be generated for both elevation and azimuth. In a non-limiting example, there are M=4 azimuth antenna by E=3 elevation antenna as shown in FIG. 6. These antenna may be separated into three Sub-Arrays: array A (antennas A1, A2, A3, A4), B (antennas B1, B2, B3, B4), C (antennas C1, C2, C3, C4). A single spatial stream (thus, rank 1) may be used for the azimuthal dimension. An eNB transmits a 4-port azimuth-oriented CRS/CSI-RS. The vertical ports (e.g. elevation) are aggregated together to form 4 azimuth ports. For example, the antenna in FIG. 6, ports {*1} (sub array 1) are aggregated together (e.g., A1, B1, C1) via an aggregation strategy to form a single azimuth port with +45° polarization, ports {*2} (sub array 2) are aggregated via an aggregation strategy to form a single azimuth port with −45° polarization (e.g., A2, B2, C2), ports {*3} (sub array 3) are aggregated via an aggregation strategy to form a single azimuth port with +45° polarization (antennas A3, B3, C3) and ports {*4} are aggregated via an aggregation strategy to form a single azimuth port with −45° polarization (antennas A4, B4, C4). The aggregation can be via a specific DL phasing vector (e.g., a beamforming vector) that is optimized for overall cell coverage. Also, the aggregation can be CSD/CDD/CSTD. The UE receives the 4-port azimuth-oriented CRS/CSI-RS and computes a 4-port PMI assuming azimuth-only adaptation.

Next, the eNB transmits a 3-port elevation-oriented CSI-RS where the roles of the vertical and horizontal (e.g., azimuthal) ports are switched. The horizontal ports are aggregated together to form 3 elevation ports. For example, Arrays A, B, C (610, 620, 630) of FIG. 6. Thus, ports {A*} are aggregated (e.g., A1, A2, A3, A4) via an aggregation strategy to form a single elevation port, ports {B*} are aggregated (e.g. B1, B2, B3, B4) via an aggregation strategy to form a single elevation port and ports {C*} are aggregated (e.g. C1, C2, C3, C4) via an aggregation strategy to form a single elevation port. As above, the aggregation can be via a specific DL phasing (beamforming) vector that is optimized for overall cell coverage. Also, the aggregation can be via CSD/CDD/CSTD. The UE detects the 3-port elevation-oriented CSI-RS and computes a 3-port PMI assuming elevation-only adaptation. The UE then feeds back the elevation-oriented PMI and the azimuth-oriented PMI.

Figure 7:
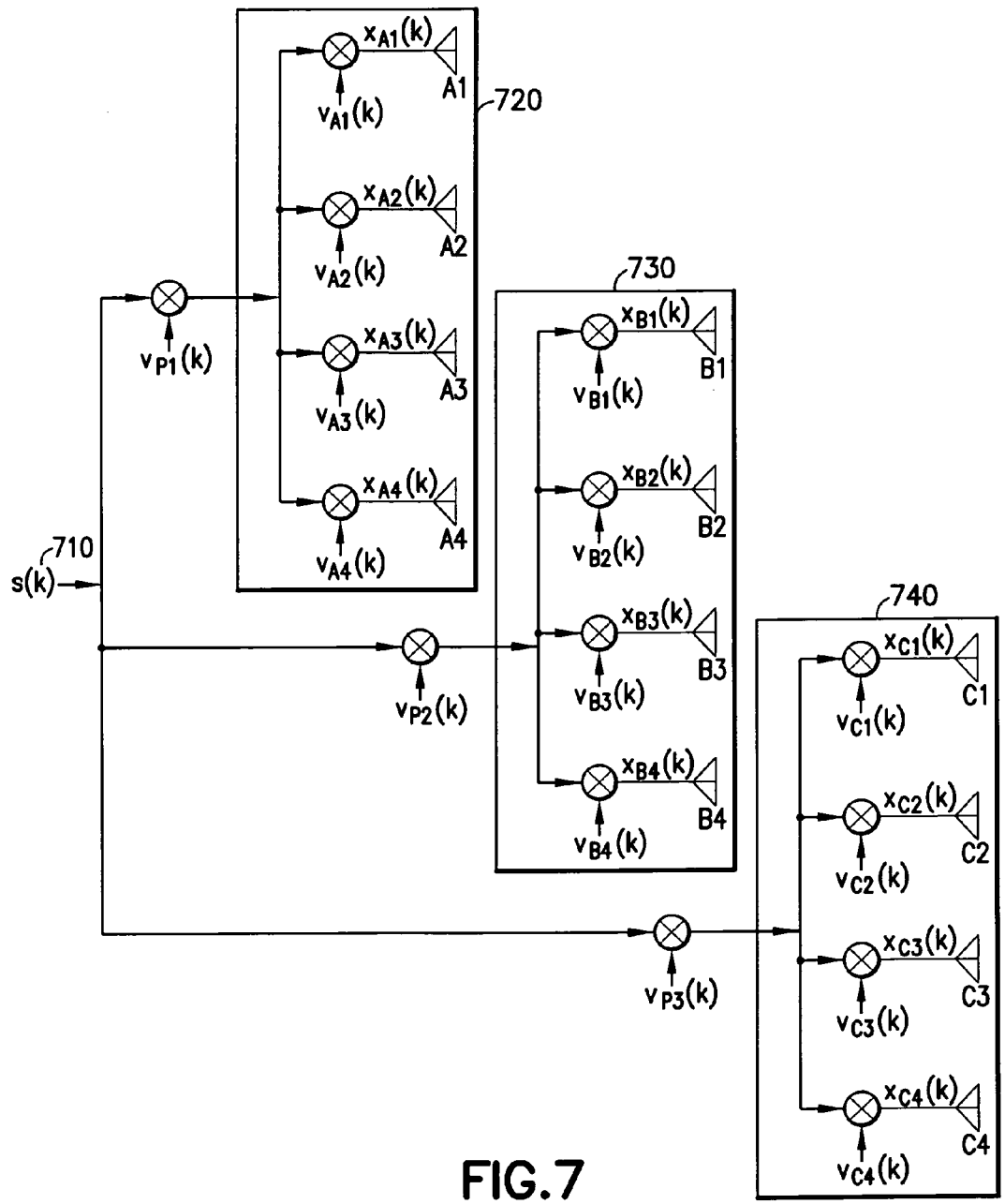
FIG. 7 illustrates controlling the antenna array for 3D-MIMO.

FIG. 7 shows an example for M=4, E=3 in which each elevation sub-array has an associated M=4 element sub-array weight vector: $V_A$, $V_B$, $V_C$, defined as follows:

$$V_A(k) = \begin{bmatrix} V_{A1}(k) \\ \vdots \\ V_{AM}(k) \end{bmatrix}, V_B(k) = \begin{bmatrix} V_{B1}(k) \\ \vdots \\ V_{BM}(k) \end{bmatrix}, V_C(k) = \begin{bmatrix} V_{C1}(k) \\ \vdots \\ V_{CM}(k) \end{bmatrix}, \text{etc.}$$

where the index k refers to time and/or frequency (e.g., time symbol, OFDM subcarrier, OFDMA resource block, etc.). The E=3 sub-arrays are then steered with another E=3 element weight vector: $V_p(k)$ defined as follows:

$$V_p(k) = \begin{bmatrix} V_{p1}(k) \\ \vdots \\ V_{pE}(k) \end{bmatrix}.$$

It can be noted that thus far this notational framework for defining the transmit weights is suitable for any strategy for computing the transmit weights. In other words, any transmit weight vector of length M×E for the M×E-element antenna array can be decomposed into the above structure by simply setting Vp(k) to be all ones and by setting the weights in each elevation sub-array to the appropriate value.

However, for jointly controlling azimuth and elevation the use of a simplified strategy may be employed in which the E elevation sub-arrays are first beamformed in the azimuth dimension with identical weight vectors (i.e., for E=3: $V_A=V_B=V_C$) to form E identical beams in elevation. These E elevation beams are then beamformed together (i.e., "co-phased") with the E-element weight vector Vp(k). To jointly adapt in both elevation and azimuth an M-antenna codebook can be used first to adapt the azimuth dimension, followed by using an E-element codebook to control the elevation dimension. Since the beams are more tailored, this provides additional improvements for narrower antenna beams (e.g., in access or backhaul layers).

CSI reference signals (CSI-RS) may be used to support user-specific vertical plus azimuth beamforming. The eNB controls both vertical and azimuth beams; however, the UE needs to measure RSs from the eNB which sound in both the azimuth (1-4) and elevation (A-C) spaces for feedback (e.g., using a codebook for each space or dimension). The UE should know which CSI-RS are for azimuth and which CSI-RS are for elevation. Additionally, the CSI-RS design may provide handling of legacy UEs, for example, by providing azimuth CSI-RS in a common location.

CSI-RS can be designed such that the CSI-RS sound in azimuth and elevation dimensions. The UE can then be informed of which CSI-RS is for azimuth and which is for elevation. The CSI-RS may be identified by the port (or antenna) that is used to transmit the CSI-RS. Some ports may be used for elevation in addition to azimuth ports. In order to provide support for legacy UE, the azimuth ports may be defined such that the same ports in a legacy system are used, e.g. ports 15-22.

Additionally, the eNB may base the CSI-RS design on various other factors. For example, the eNB may consider the deployment needs, antenna arrangements and update rates. This allows the CSI-RS to be more flexible and accommodate the needs of the system as well as user-specific conditions.

In one non-limiting exemplary embodiment, ports 15-22 are used for antennas A1-A8 (using the notation in FIG. 6), ports 23-30 are used for B1-B8, etc., where in this example, each antenna port is referring to a particular logical antenna in an array similar to the one shown in FIG. 6 for example. In another non-limiting exemplary embodiment, a two-dimensional approach to port mapping is taken—Ports 15-22 are used for azimuth antennas 1-8 and additional ports are defined for elevation (e.g., elevation port 0-2), where in this example, an azimuth antenna port being identified can be formed by aggregating antennas in elevation (e.g., azimuth port 15 that indicates azimuth antenna 1 could be formed by aggregating A1, B1, C1 in the array of FIG. 6) and an elevation antenna port being identified can be formed by aggregating antennas in azimuth (e.g., elevation port 0 could be formed by aggregating A1, A2, A3, A4 in the array of FIG. 6).

CSI-RS for a subset of elevation and azimuth ports may be assigned to different time frequency/code (aka CDM)/sequence resources. For example, ports A1-A4 are sounded at a first time interval, ports B1-B4 are sounded at a second time interval and ports C1-C4 are sounded at a third time interval. The rates at which the ports are sounded can be adjusted such that they are the same for each sounding operation or different. The flexible assignment strategy enables multiplexing in time, frequency, code, and sequence spaces. As another example, ports A1-A4 are sounded at a first frequency region, ports B1-B4 are sounded at a second frequency region, and ports C1-C4 are sounded at a third frequency region. As yet another example, ports A1-A4 are sounded at a particular time/frequency resource using one CDM code/sequence, ports B1-B4 are sounded at the same time/frequency resource using a second CDM code/sequence, and ports C1-C4 are sounded at the same time/frequency resource using a third CDM code/sequence. (In these examples, a time interval can mean the time duration of a Resource Block in LTE Rel8/10. A frequency region can mean the length in frequency of a Resource Block in LTE Rel8/10. A time/frequency resource can mean a set of resource elements within a Resource Block that are allocated for CSI-RS transmission).

The eNB signals to the UE regarding the structure of the CSI-RS. The signaling may be performed using control signaling. The eNB may indicate to the UE how many azimuth ports will be used and how many elevation ports will be used. The eNB may also provide an indication (implicitly or explicitly) of where the azimuth CSI-RS are located and where the elevation CSI-RS are located.

The signaling also may indicate which feedback method (e.g., specific codebook) the UE should use (the feedback method may depend on the port definition being used). The feedback codebook may be a 3×4 product codebook, for example in a 3 elevation array and 4 azimuthal port layout. This provides a less complex codebook than using a 12 element codebook.

Legacy UEs (those measuring azimuth only) can still measure azimuth CSI-RS in order to provide feedback and may ignore the elevation CSI-RS. In such cases, signaling of the structure of the CSI-RS may be provided to the legacy UEs in such a way that a legacy UE identifies only the azimuth ports. Alternatively, the CSI-RS may be selected such that azimuth CSI-RS match those of a legacy system (in which case signaling of the structure of the CSI-RS may not be required for the legacy UEs).

Figure 8:
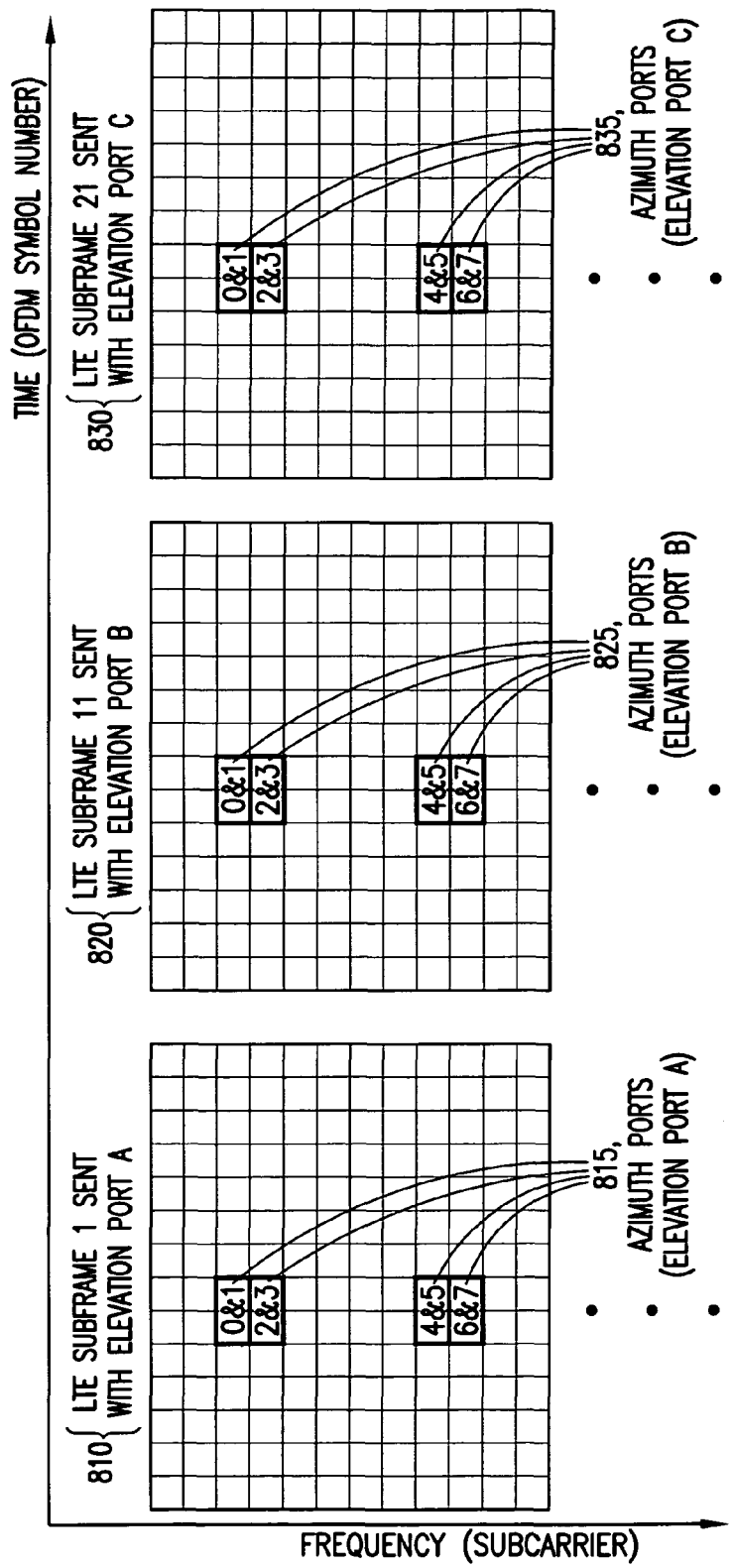
FIG. 8 shows a frequency time diagram of an exemplary port assignment in accordance with this invention.

FIG. 8 shows a frequency/time diagram of an exemplary port assignment in accordance with this invention. As shown, a first LTE subframe (subframe 1) is selected for sending the CSI-RS using elevation port A and azimuthal ports 0-7. At a second LTE subframe (subframe 11) the CSI-RS are to be sent using elevation port B and reusing azimuthal ports 0-7. Similarly, at a third LTE subframe (subframe 21) the CSI-RS are to be sent using elevation port C and reusing azimuthal ports 0-7.

As shown in FIG. 8, azimuthal ports 0 and 1 use the same frequency subcarrier and occupy the same OFDM symbol number. To separate the CSI-RS for the two ports, a spreading code may be used. For example port 0 would send +1 on the first OFDM symbol and +1 on the second OFDM symbol and port 1 would send +1 on the first OFDM symbol and −1 on the second OFDM symbol. Likewise, additional port pairs may be similarly spaced. In another embodiment, azimuthal ports 0 and 1 use the same frequency subcarrier and use different OFDM symbol numbers. Again likewise, additional port pairs may be similar spaced. In yet another embodiment the azimuthal ports 0 and 1 use the same frequency subcarrier and the same OFDM symbol number but are separated by using different pilot sequences in frequency (e.g., by using quasi-orthogonal sequences).

Further details of how the sounding in time methodology (as embodied in FIG. 8) are done. On a particular subframe, $n_e$, in a designated radio frame, all azimuth antennas (0-7) are sounded using elevation beam e. At different subframes all azimuth antennas are sounded for all E elevation beams. For this method the UE knows (e.g., via information that is signaled from the eNB or is implicit from the definition of the RS design): 1) the number of azimuth and elevation antennas, 2) which subframes (and also possibly which radio frames) are for which elevation beams, and 3) the locations of the RSs. In equation form the RS on subcarrier k on OFDM symbol t for the sounding in time methodology may be expressed as:

$$p_{m,b}(k, t) = \begin{cases} 0 & k \neq k_m \text{ and subframe} \neq n_b \\ (-1)^{mt} x(k) & \text{otherwise} \end{cases}$$

where m is the azimuth antenna, b is the elevation beam, $k_m$ is a subcarrier which contains the RS for azimuth antenna m, and x(k) is some suitable base pilot sequence like a QPSK sequence or a GCL sequence. Note that the role of the azimuth and elevation antennas can be switched in the above description. Note also that legacy UEs may be agnostic to the different elevation beams in time and may still be scheduled to measure these CSI-RS time instances.

Figure 13:
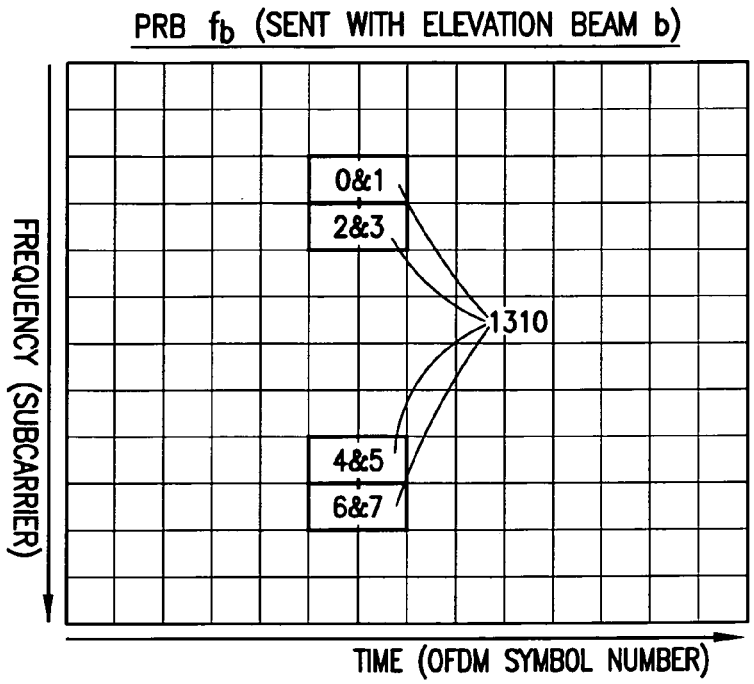
FIG. 13 shows another frequency/time diagram of an exemplary port assignment in accordance with an exemplary embodiment.

FIG. 13 shows another frequency/time diagram of different exemplary port 1310 assignment in accordance with this invention using a sounding in frequency methodology. As shown, on a particular PRB, PRB $f_b$, which is present on a particular slot in a particular radio frame, all azimuth antennas (e.g. 0-7) are sounding using elevation beam b (for example, the 8 antennas belonging to row b of the array are sounded). On different PRBs in the same or different slot all of the azimuth antennas are sounded for different elevation beams (up to E elevation beams). In this example note that azimuth antennas 0 and 1 share the same time-frequency resources as does 2 and 3, 4 and 5, and 6 and 7. Note that only one sounding time would be required if the different PRBs are all sent with the same slot. For this sounding in frequency methodology the UE knows (e.g., via information that is signaled from the eNB or is implicit from the definition of the RS design): 1) The number of azimuth and elevation antennas, 2) where the CSI-RS is located in time and frequency, 3) which PRBs are for which elevation beams, and 4) the locations of the RSs. In equation form the RS on subcarrier k on OFDM symbol t for the sounding in frequency methodology is given as:

$$p_{m,b}(k, t) = \begin{cases} 0 & k \neq k_m \text{ and } PRB \neq f_b \\ (-1)^{mt} x(k) & \text{otherwise} \end{cases}$$

where m is the azimuth antenna, b is the elevation beam, $k_m$ is a subcarrier which contains the RS for azimuth antenna m, $f_b$ is the PRB where RS are present for elevation beam b, and x(k) is some suitable base pilot sequence like a QPSK sequence or a GCL sequence. Note that the role of the azimuth and elevation antennas can be switched in the above description. Note also that legacy UEs may be agnostic to the different elevation beams in frequency and may still be scheduled to measure these CSI-RS frequency and time instances.

Figure 14:
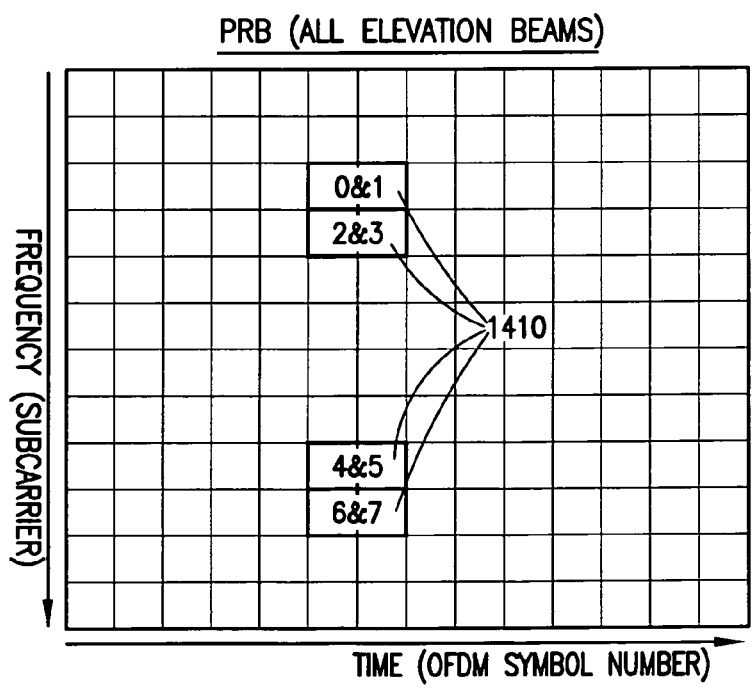
FIG. 14 shows a further frequency/time diagram of an exemplary port assignment in accordance with an exemplary embodiment.

FIG. 14 shows a further frequency/time diagram of different exemplary port 1410 assignment in accordance with this invention using a sounding in sequence (or CDM) methodology. As shown on a particular PRB on a particular slot in a particular radio frame, all azimuth antennas are sounding using all E of the elevation beams where RS is sent from each elevation beam using a different CSI-RS sequence (or CDM code) for each elevation beam. As is shown, azimuth ports 0 and 1 1410 share one common set of frequencies and all elevation beams around sounded for these azimuth ports 1410 on these common set of frequencies. Likewise, the same is true for azimuth port 1410 pairs 2 and 3, 4 and 5, and 6 and 7. For this sounding in sequence methodology the UE knows (e.g., via information that is signaled from the eNB or is implicit from the definition of the RS design): 1) the number of azimuth and elevation antennas, 2) where the CSI-RS is located in time and frequency, 3) the CSI-RS sequence (or CDM code) for each elevation beam, and 4) the locations of the RSs. In equation form the RS on subcarrier k on OFDM symbol t for the sounding in sequence methodology is given as:

$$p_{m,b}(k, t) = \begin{cases} 0 & k \neq k_m \text{ and } PRB \neq f_b \\ (-1)^{mt} x(k) & \text{otherwise} \end{cases}$$

where m is the azimuth antenna, b is the elevation beam, $k_m$ is a subcarrier which contains the RS for azimuth antenna m, $f_b$ is the PRB where RS are present for elevation beam b, and $x_b(k)$ is some suitable base pilot sequence like a QPSK sequence or a GCL sequence which is different for each elevation beam. It may be desirable (but not necessary) that $x_b(k)$ is orthogonal or quasi-orthogonal between different beams. Note that the role of the azimuth and elevation antennas can be switched in the above description. Note also that legacy UEs may be agnostic to the different elevation beams in frequency and time and may still be scheduled to measure these CSI-RS time and frequency instances.

Figure 15:
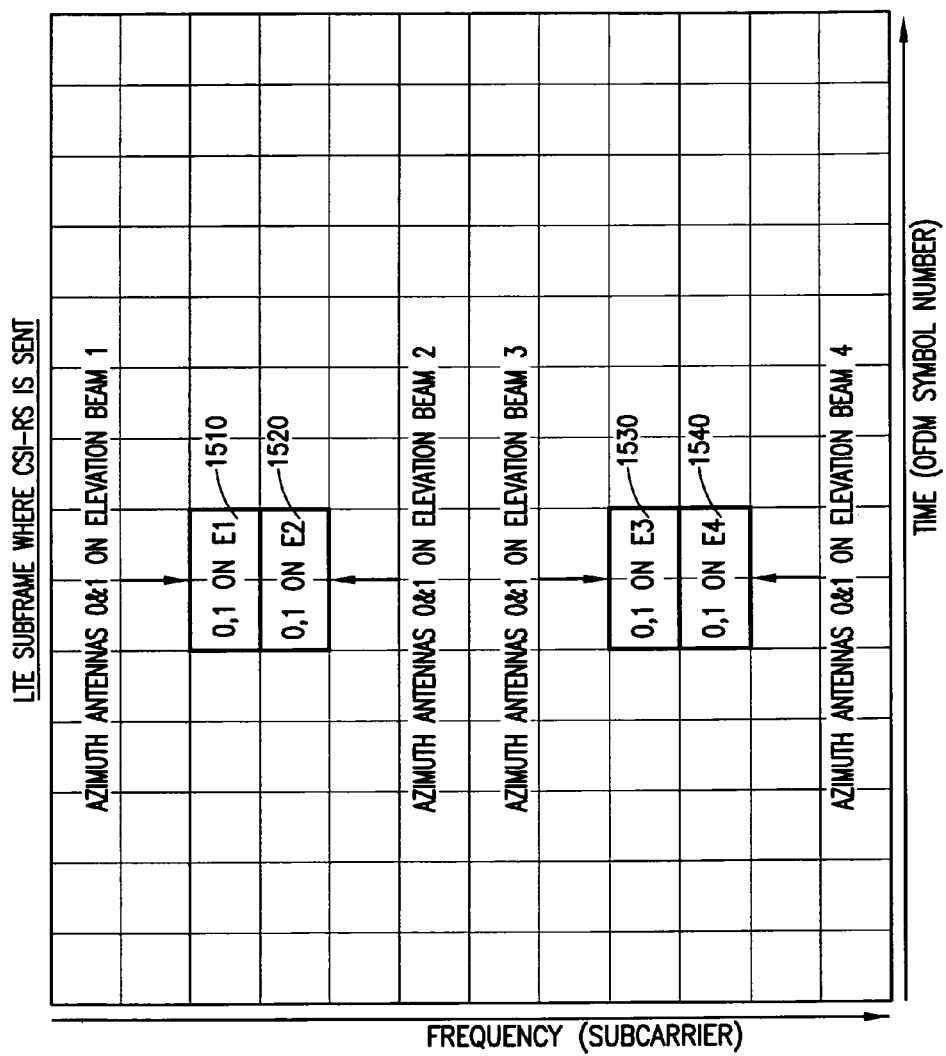
FIG. 15 shows another frequency/time diagram of an exemplary port assignment in accordance with an exemplary embodiment.

FIG. 15 shows another frequency/time diagram of different exemplary port 1510, 1520, 1530, 1540 assignment in accordance with this invention using a sounding method which reuses the CSI-RS format already defined in LTE. Since the LTE CSI-RS format is being used, only up to E*M=8 total ports 1510, 1520, 1530, 1540 can be sounded. For example as shown in FIG. 15 there are E=4 elevation beams and M=2 azimuth antennas where azimuth antennas 0 and 1 are sent on the same frequency-time resources within a PRB at multiple times with a different elevation beam being used on different parts of the frequency band. In this sounding method the UE knows (e.g., via information that is signaled from the eNB or is implicit from the definition of the RS design): 1) the number of azimuth and elevation ports 1510, 1520, 1530, 1540, 2) where the CSI-RS is located in time, which elevation beam is used on which frequencies of the PRB, and 4) the locations of the RSs. In equation form the RS on subcarrier k on OFDM symbol t for the sounding methodology using the defined LTE CSI-RS is given as:

$$p_{m,b}(k, t) = \begin{cases} 0 & k \neq k_m \text{ and } k \neq s_b \\ (-1)^{mt} x(k) & \text{otherwise} \end{cases}$$

where m is the azimuth antenna, b is the elevation beam, $k_m$ is a subcarrier which contains the RS for azimuth antenna m, $s_b$ is the subcarrier where RS are present for elevation beam b, and x(k) is some suitable base pilot sequence like a QPSK sequence or a GCL sequence. Note that the role of the azimuth and elevation antennas can be switched in the above description. Note also that legacy UEs may be agnostic to the different elevation beams in frequency and time and may still be scheduled to measure these CSI-RS time and frequency instances. Note also that ports 1510 include azimuthal antennas 0 and 1 on elevation beam 1, ports 1520 include azimuthal antennas 0 and 1 on elevation beam 2, ports 1530 include azimuthal antennas 0 and 1 on elevation beam 3 and ports 1540 include azimuthal antennas 0 and 1 on elevation beam 4.

In the above methodologies some variations are possible such as: 1) The elevation dimension could be sounded less frequently than the azimuth dimension, 2) Common RSs (CRSs) are used and the eNB indicates it has 2 azimuth antennas and 2 elevation antennas (a standard may specify which CRS are for azimuth and which are for elevation), 3) The mapping of antenna ports or CSI-RS resources to azimuth and elevation may be signaled to the UE or fixed in the specifications, e.g. ports A1, B1, A2, B2 may mean (A1,B1) and (A2,B2) are separable in azimuth, (A1,A2) and (B1,B2) are separable in elevation, and 4) Some ports and some CSI-RS resources can be shared with legacy UEs that are agnostic to the distinction between elevation and azimuth.

Also for the above methodologies, signaling, such as higher-layer signal, may be used for the elevation and azimuth RSs to be useful to the UEs. For example signaling may be used for the sequence of elevation beams in time and/or frequency. In particular a fixed pattern of elevation beams which may be specified depending on the number of elevation beams and the CSI subframe configuration (such as the periodicity, the offset, or the subframe number) may be signaled. Note that the fixed pattern of elevation beams may depend on the cell ID of the eNB sending the RS. Note that the pattern of the elevation beams may be configured using the higher-layer signaling to provide some coordination between eNBs such as to avoid interference from and to CSI-RS in neighboring sectors or cells. Other possible signaling may include: 1) the assignment of multiple CSI-RS sequences to a single UE, 2) the mapping of the assigned sequences to ports, 3) the mapping of the assigned CSI-RS sequences to CSI-RS resources, 4) defining CSI-feedback based on multiple CSI-RS sequences. Also signaling may describe the mapping of CSI-RS ports to the azimuth and/or elevation dimensions. It may be that a CSI-RS resource (defined by periodicity, subframe offset, or resource element location) may be mapped to a particular dimension (azimuth or elevation) where a dimension may be equivalent to a set of ports.

Figure 9:
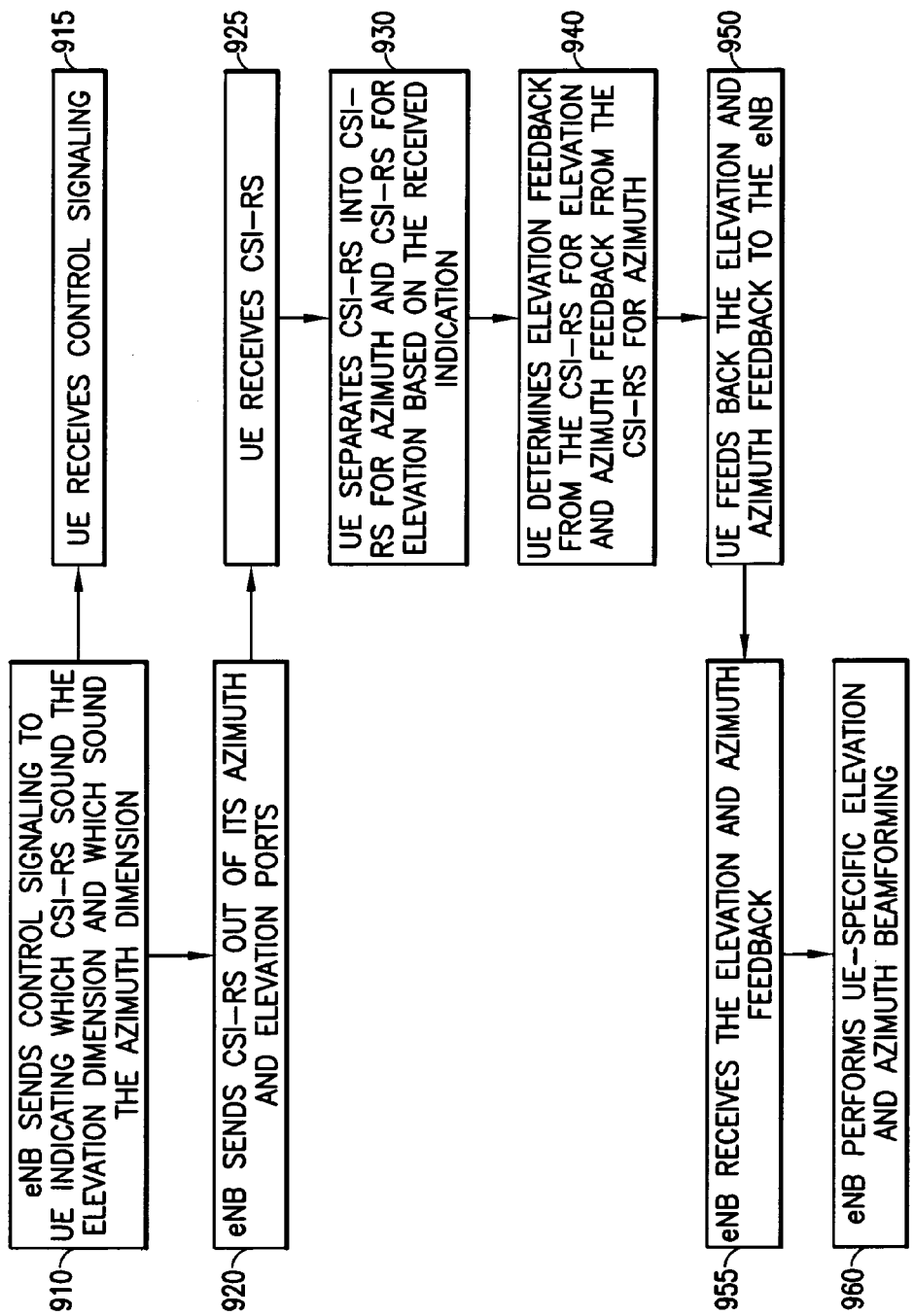
FIG. 9 shows a signaling diagram of an exemplary embodiment in accordance with this invention.

FIG. 9 shows a signaling diagram of an exemplary embodiment in accordance with this invention. At time 910, the eNB sends control signaling to an UE. The control signaling provides an indication of which CSI-RS sound the elevation dimension and which sound the azimuth dimension. This control signaling can take on any form from an explicit messaging containing the time and frequency locations of the azimuth and elevation CSI-RS or may simply be a signaling of the number of azimuth and elevation ports (antennas) and then the locations of CSI-RS for azimuth and elevation are implicit from a commonly agreed upon location (e.g., as defined in the LTE standard). At time 915, the UE receives the control signaling.

Other forms of signaling (either explicit or implicit) might also be part of the control signaling as well. One example is the periodicity of the CSI-RS for either azimuth, elevation, or both. Other examples would be the offset (in time or frequency) of the CSI-RS and also the subframe number containing the CSI-RS. Also the ordering the elevation beams being sounded could be configured across sectors and or eNBs so that inter-cell interference is minimized (i.e., one eNB sounds using an elevation beam which illuminates the area near the eNB when a different eNB sounds an elevation beam which illuminates the cell edge). Other forms of signaling could include:

1) The assignment of multiple CSI-RS sequences to a single UE (i.e., so the UE can obtain CSI-RS for more than a single elevation beam).
2) The mapping of the CSI-RS assigned sequences to actual ports (in elevation and/or azimuth).
3) The mapping of the assigned CSI-RS sequences to CSI-RS resources (in time and/or frequency) where it is possible that multiple sequences are mapped to the same CSI-RS resource (e.g., when sequences or codes are used to distinguish the sequences).

At time 920, the eNB sends the CSI-RS out of its azimuth and elevation ports. The CSI-RS are sent as indicated by the control signaling. At time 925, the UE receives CSI-RS. While receiving the CSI-RS, the UE may perform CSI measurements (e.g. channel estimation).

The UE separates CSI-RS into CSI-RS for azimuth and CSI-RS for elevation based on the received indication at time 930. By knowing in advance which CSI-RS are used for azimuth and which are used for elevation, the UE may more efficiently perform the separation CSI-RS (for example, over a brute force approach of adding more ports). Then, at time 940, the UE determines elevation feedback from the CSI-RS for elevation and azimuth feedback from the CSI-RS for azimuth.

At time 950, the UE feeds back the elevation and azimuth feedback (e.g., as a codebook precoder matrix index (PMI), covariance matrix, eigenvectors, etc.) to the eNB, which receives the elevation and azimuth feedback at time 955. At time 960, the eNB performs UE-specific elevation and azimuth beamforming based on the feedback.

As described above, CSI-RS can be configured to enable the UE to be able to separately determine channel information for the azimuth and elevation dimensions. In place of the CSI-RS common reference symbols (CRS) can be configured to enable the UE to determine channel information for the azimuth and elevation dimensions as well. For example, if there are 2 azimuth ports, 2 elevation ports, and 4 ports for the CRS (0-3) then, for example, ports 0-1 can be sent from both azimuth ports and one of the elevation ports and ports 2-3 can be sent from both azimuth ports and the other elevation port. As in the CSI-RS case signaling from the eNB will be necessary for the UE to know which ports of the CRS are for azimuth and which are for elevation.

The azimuth and elevation ports may be sounded separately by employing an antenna aggregation technique, e.g., a large delay cyclic shift diversity (CSD), in the dimension not being sounded. The CSI-RS pattern may handle eight ports 815, 825, 835 (either azimuth or elevation) as shown in FIG. 8. For example, during one slot 810, 820, 830 (whose timing is configured by the eNB) the eNB sends azimuth-orientated RSs by using CSD to aggregate the elevation ports (e.g., A-C in FIG. 6) associated with a given azimuth port (e.g. 1-4 in FIG. 6). In equation form the CSI-RS sequence across frequency (k) for azimuth port in and elevation port b on OFDM symbol t would be given by:

$$p_{m,b}(k, t) = \begin{cases} 0 & k \neq k_m \\ (-1)^{mt} x(k) e^{-j2\pi k(b-1)/N_{CSD}} & \text{otherwise} \end{cases}, \quad (2)$$

where $k_m$ is the subcarrier index which contains CSI-RS for azimuth port m, x(k) is a scrambling RS sequence, E is the number of elevation ports, and a CSD shift value, $N_{CSD}$ (e.g., $N_{CSD}=12E$). Since the elevation antennas are aggregated together with CSD, the UE can obtain azimuth-orientated feedback.

At a different slot time (also as configured by the eNB), the eNB would send elevation-orientated RSs by using CSD to aggregate the azimuth ports. In equation form the CSI-RS sequence across frequency (k) for elevation port b and azimuth port m on OFDM symbol t would be given by $$p_{m,b}(k,t) = \begin{cases} 0 & k \neq k_b \\ (-1)^{bt} x(k) e^{-j2\pi k(m-1)/N_{CSD}} & \text{otherwise} \end{cases} \quad (3)$$

where $k_b$ is the subcarrier index which contains CSI-RS for elevation port b, x(k) is a standard scrambling RS sequence, M is the number of azimuth ports, and a CSD shift value, $N_{CSD}$ (e.g., $N_{CSD}$=12M). Since the azimuth antennas are aggregated together with CSD, the UE can obtain elevation-orientated feedback.

Using the azimuth-oriented RSs and the elevation-orientated RSs, the UE can determine feedback for each dimension separately.

Based on the foregoing it should be apparent that the exemplary embodiments of this invention provide a method, apparatus and computer program(s) to design reference signals for per-user elevation beamforming.

Figure 10:
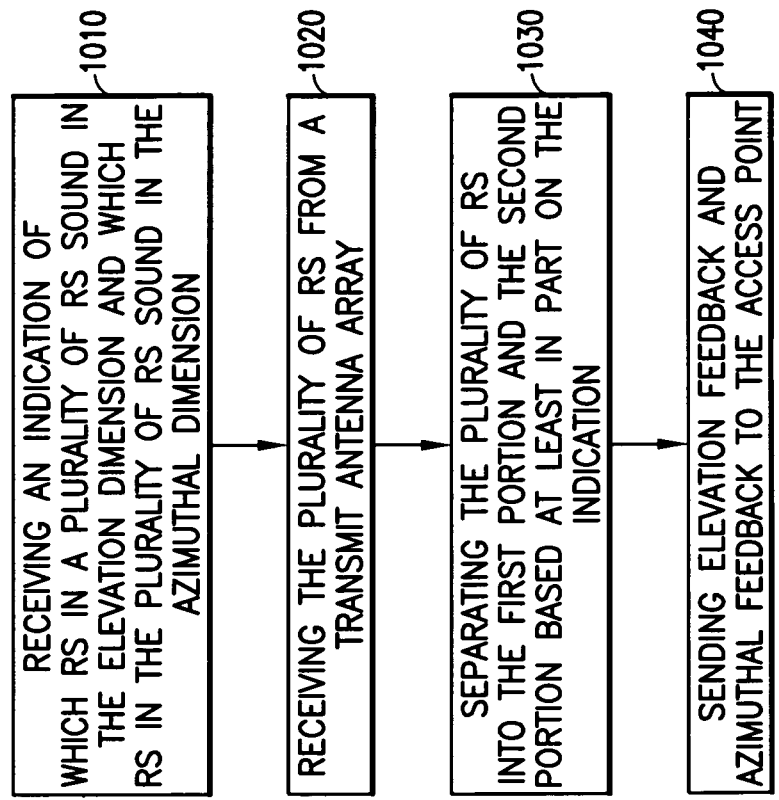
FIG. 10 is a logic flow diagram that illustrates the operation of an exemplary method, and a result of execution of computer program instructions embodied on a computer readable memory, in accordance with various exemplary embodiments of this invention.

FIG. 10 is a logic flow diagram that illustrates the operation of a method, and a result of execution of computer program instructions, in accordance with the exemplary embodiments of this invention. In accordance with these exemplary embodiments a method performs, at Block 1010, a step of receiving an indication of which RSs in a plurality of RSs sound in the elevation dimension and which RSs in the plurality of RSs sound in the azimuthal dimension. At Block 1020, the method performs a step of receiving the plurality of RSs from a transmit antenna array. A step of separating the plurality of RSs into the first portion and the second portion based at least in part on the indication is performed by the method at Block 1030. Note that from the indication it would be clear that there is one portion of the CSI-RS for elevation and one portion for azimuth. So when the UE receives CSI-RS, it has to separate them into those two portions. The method also performs, at Block 1040, a step of sending elevation feedback and azimuthal feedback to the access point.

Figure 11:
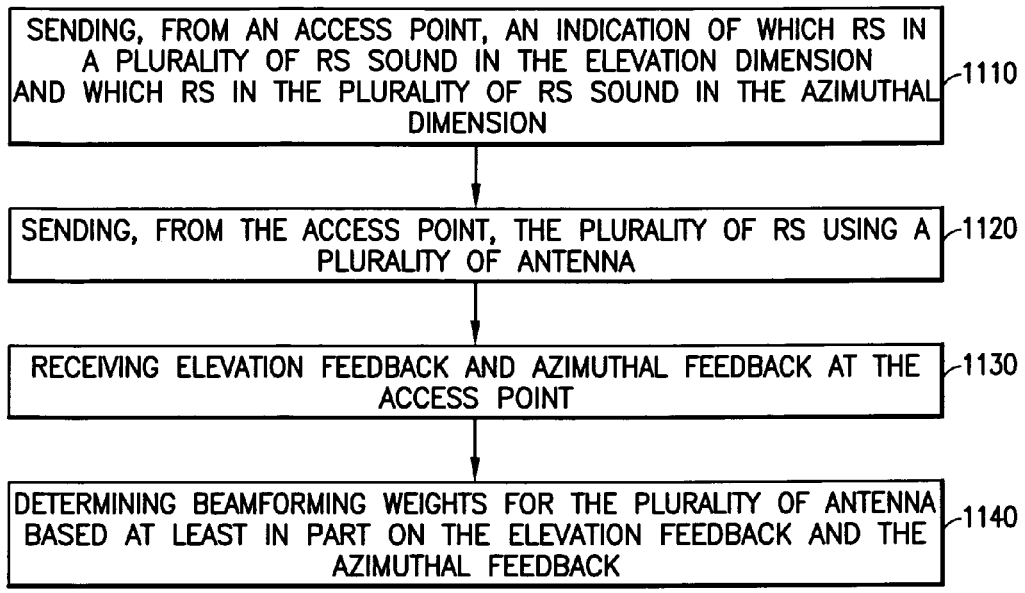
FIG. 11 is another logic flow diagram that illustrates the operation of an exemplary method, and a result of execution of computer program instructions embodied on a computer readable memory, in accordance with various exemplary embodiments of this invention.

FIG. 11 is another logic flow diagram that illustrates the operation of a method, and a result of execution of computer program instructions, in accordance with the exemplary embodiments of this invention. In accordance with these exemplary embodiments a method performs, at Block 1110, a step of sending, from an access point, an indication of which RSs in a plurality of RSs sound in the elevation dimension and which RSs in the plurality of RSs sound in the azimuthal dimension. At Block 1120, the method performs a step of sending, from the access point, the plurality of RSs using a plurality of antenna. A step of receiving elevation feedback and azimuthal feedback at the access point is performed by the method at Block 1130. The method also performs, at Block 1140, a step of determining beamforming weights for the plurality of antenna based at least in part on the elevation feedback and the azimuthal feedback.

Figure 12:
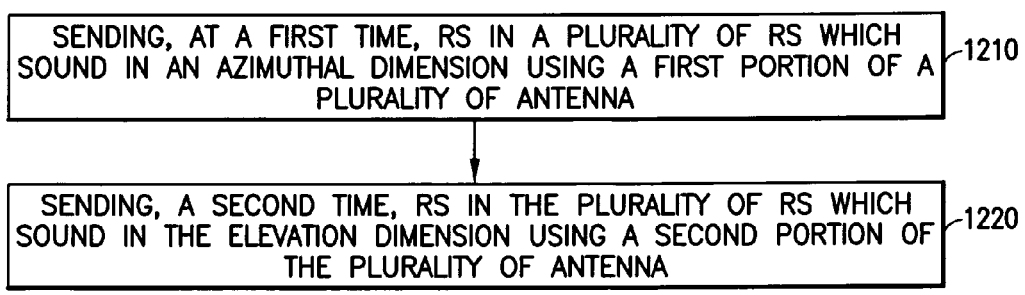
FIG. 12 is a further logic flow diagram that illustrates the operation of an exemplary method, and a result of execution of computer program instructions embodied on a computer readable memory, in accordance with various exemplary embodiments of this invention.

FIG. 12 is another logic flow diagram that illustrates the operation of a method, and a result of execution of computer program instructions, in accordance with the exemplary embodiments of this invention. In accordance with these exemplary embodiments a method performs, at Block 1210, a step of sending, at a first time, RSs in a plurality of RSs which sound in an azimuthal dimension using a first portion of a plurality of antenna. The method also performs, at Block 1220, a step of sending, a second time, RSs in the plurality of RSs which sound in the elevation dimension using a second portion of the plurality of antenna.

The various blocks shown in FIGS. 9-12 may be viewed as method steps, and/or as operations that result from operation of computer program code, and/or as a plurality of coupled logic circuit elements constructed to carry out the associated function(s).

An exemplary embodiment provides a method to design reference signals for per-user elevation beamforming. The method includes receiving (such as by a receiver) an indication of which RSs in a plurality of RSs sound in the elevation dimension and which RSs in the plurality of RSs sound in the azimuthal dimension. The method includes receiving (such as by a receiver) the plurality of RSs from a transmit antenna array and separating (such as by a processor) the plurality of RSs into the first portion and the second portion based at least in part on the indication. The method also includes sending (such as by a transmitter) elevation feedback and azimuthal feedback to the access point.

In a further exemplary embodiment of the method above, the indication includes at least one of: a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the methods above, the first portion of the RSs contains RSs for the azimuthal dimension and second portion of the RSs contains RSs for the elevation dimension.

In a further exemplary embodiment of any one of the methods above, the RSs are CSI-RSs.

In another exemplary embodiment of any one of the methods above, receiving the plurality of RSs includes, for each RS of the plurality of RSs, performing measurements of the RS.

In a further exemplary embodiment of any one of the methods above, receiving the plurality of RSs includes receiving a first subset of the RSs at a first time-frequency location; and receiving a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the methods above, receiving the plurality of RSs includes receiving a first subset of the RSs on a first set of frequencies; and receiving a second subset of the RSs on a second set of frequencies where the first set of frequencies is different from the second set of frequencies.

In a further exemplary embodiment of any one of the methods above, receiving the plurality of RSs includes receiving a first subset of the RSs at one time on one set of frequencies; and receiving a second subset of the RSs at the same time on the same set of frequencies where the first subset employs one sequence or spreading code and the second sequence employs a different sequence or spreading code.

In another exemplary embodiment of any one of the methods above, separating the plurality of RSs is further based on the time the RS was received.

In a further exemplary embodiment of any one of the methods above, the method also includes receiving an indication of a codebook. The elevation feedback and the azimuthal feedback is based on the codebook.

Another exemplary embodiment provides a method to design reference signals for per-user elevation beamforming. The method includes sending (such as by a transmitter), from an access point, an indication of which RSs in a plurality of RSs sound in the elevation dimension and which RSs in the plurality of RSs sound in the azimuthal dimension. The method includes sending (such as by a transmitter), from the access point, the plurality of RSs using a plurality of antenna and receiving (such as by a receiver) elevation feedback and azimuthal feedback at the access point. The method also includes determining (such as by a processor) beamforming weights for the plurality of antenna based at least in part on the elevation feedback and the azimuthal feedback.

In a further exemplary embodiment of the method above, the indication includes a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the methods above, the RSs are CSI-RSs.

In a further exemplary embodiment of any one of the methods above, sending the plurality of RSs includes sending a first subset of the RSs at a first time-frequency location; and sending a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the methods above, sending the plurality of RSs includes sending a first subset of the RSs on a first set of frequencies; and sending a second subset of the RSs on a second set of frequencies where the first set of frequencies is different from the second set of frequencies.

In a further exemplary embodiment of any one of the methods above, sending the plurality of RSs includes sending a first subset of the RSs at one time on one set of frequencies; and sending a second subset of the RSs at the same time on the same set of frequencies where the first subset employs one sequence or spreading code and the second sequence employs a different sequence or spreading code.

In another exemplary embodiment of any one of the methods above, the method also includes sending an indication of a codebook. The elevation feedback and determining the azimuthal feedback are based on the codebook.

In a further exemplary embodiment of any one of the methods above, the beamforming weights provide beamforming in at least elevation.

In another exemplary embodiment of any one of the methods above, sending the plurality of RSs includes sending the RSs in the plurality of RSs which sound in the azimuthal dimension using a first portion of the plurality of antenna; and sending the RSs in the plurality of RSs which sound in the elevation dimension using a second portion of the plurality of antenna.

A further exemplary embodiment provides a method to send reference signals for per-user elevation beamforming. The method includes sending (such as by a transmitter), at a first time, RSs in a plurality of RSs which sound in an azimuthal dimension using a first portion of the plurality of antenna. The method also includes sending (such as by a transmitter), at a second time, RSs in the plurality of RSs which sound in an elevation dimension using a second portion of the plurality of antenna.

In another exemplary embodiment of the method above, sending the RSs which sound in the azimuthal dimension includes aggregating elevation antenna of the plurality of antenna. The elevation antenna may be aggregated using CSD.

In a further exemplary embodiment of any one of the methods above, sending the RSs which sound in the elevation dimension includes aggregating azimuthal antenna of the plurality of antenna. The azimuthal antenna may be aggregated using cyclical shift diversity.

Another exemplary embodiment provides an apparatus to design reference signals for per-user elevation beamforming. The apparatus includes at least one processor and at least one memory storing computer program code. The at least one memory and the computer program code are configured to, with the at least one processor, cause the apparatus to perform actions. The actions include to receive an indication of which RSs in a plurality of RSs sound in the elevation dimension and which RSs in the plurality of RSs sound in the azimuthal dimension. The actions include to receive the plurality of RSs from a transmit antenna array and to separate the plurality of RSs into the first portion and the second portion based at least in part on the indication. The actions also include to send elevation feedback and azimuthal feedback to the access point.

In a further exemplary embodiment of the apparatus above, the indication includes at least one of: a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the apparatus above, the first portion of the RSs contains RSs for the azimuthal dimension and second portion of the RSs contains RSs for the elevation dimension.

In a further exemplary embodiment of any one of the apparatus above, the RSs are CSI-RSs.

In another exemplary embodiment of any one of the apparatus above, receiving the plurality of RSs includes, for each RS of the plurality of RSs, performing measurements of the RS.

In a further exemplary embodiment of any one of the apparatus above, receiving the plurality of RSs includes receiving a first subset of the RSs at a first time-frequency location; and receiving a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the apparatus above, receiving the plurality of RSs includes receiving a first subset of the RSs on a first set of frequencies; and receiving a second subset of the RSs on a second set of frequencies. The first set of frequencies is different from the second set of frequencies.

In a further exemplary embodiment of any one of the apparatus above, receiving the plurality of RSs includes receiving a first subset of the RSs at one time on one set of frequencies; and receiving a second subset of the RSs at the same time on the same set of frequencies. The first subset employs one sequence or spreading code and the second sequence employs a different sequence or spreading code.

In another exemplary embodiment of any one of the apparatus above, separating the plurality of RSs is further based on the time the RS was received.

In a further exemplary embodiment of any one of the apparatus above, the actions also include to receive an indication of a codebook. The elevation feedback and the azimuthal feedback is based on the codebook.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides an apparatus to design reference signals for per-user elevation beamforming. The apparatus includes at least one processor and at least one memory storing computer program code. The at least one memory and the computer program code are configured to, with the at least one processor, cause the apparatus to perform actions. The actions include to send, from an access point, an indication of which RSs in a plurality of RSs sound in the elevation dimension and which RSs in the plurality of RSs sound in the azimuthal dimension. The actions include to send, from the access point, the plurality of RSs using a plurality of antenna and to receive elevation feedback and azimuthal feedback at the access point. The actions also include to determine beamforming weights for the plurality of antenna based at least in part on the elevation feedback and the azimuthal feedback.

In a further exemplary embodiment of any one of the apparatus above, the indication includes a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the apparatus above, the RSs are CSI-RSs.

In a further exemplary embodiment of any one of the apparatus above, sending the plurality of RSs includes sending a first subset of the RSs at a first time-frequency location; and sending a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the apparatus above, sending the plurality of RSs includes sending a first subset of the RSs on a first out of frequencies; and sending a second subset of the RSs on a second set of frequencies. The first set of frequencies is different from the second set of frequencies.

In a further exemplary embodiment of any one of the apparatus above, sending the plurality of RSs includes sending a first subset of the RSs at one time on one set of frequencies; and sending a second subset of the RSs at the same time on the same set of frequencies. The first subset employs one sequence or spreading code and the second sequence employs a different sequence or spreading code.

In another exemplary embodiment of any one of the apparatus above, the actions also include to send an indication of a codebook. The elevation feedback and determining the azimuthal feedback are based on the codebook.

In a further exemplary embodiment of any one of the apparatus above, the beamforming weights provide beamforming in at least elevation.

In another exemplary embodiment of any one of the apparatus above, sending the plurality of RSs includes sending the RSs in the plurality of RSs which sound in the azimuthal dimension using a first portion of the plurality of antenna; and sending the RSs in the plurality of RSs which sound in the elevation dimension using a second portion of the plurality of antenna.

In a further exemplary embodiment of any one of the apparatus above, the apparatus is embodied in a mobile device.

In another exemplary embodiment of any one of the apparatus above, the apparatus is embodied in an integrated circuit.

A further exemplary embodiment provides an apparatus to send reference signals for per-user elevation beamforming. The apparatus includes at least one processor and at least one memory storing computer program code. The at least one memory and the computer program code are configured to, with the at least one processor, cause the apparatus to perform actions. The actions include to send, at a first time, RSs in a plurality of RSs which sound in an azimuthal dimension using a first portion of the plurality of antenna. The actions also include to send, at a second time, RSs in the plurality of RSs which sound in an elevation dimension using a second portion of the plurality of antenna.

In another exemplary embodiment of the apparatus above, sending the RSs which sound in the azimuthal dimension includes aggregating elevation antenna of the plurality of antenna. The elevation antenna may be aggregated using CSD.

In a further exemplary embodiment of any one of the apparatus above, sending the RSs which sound in the elevation dimension includes aggregating azimuthal antenna of the plurality of antenna. The azimuthal antenna may be aggregated using cyclical shift diversity.

In another exemplary embodiment of any one of the apparatus above, the apparatus embodied in a mobile device.

In a further exemplary embodiment of any one of the apparatus above, the apparatus is embodied in an integrated circuit.

Another exemplary embodiment provides a computer readable medium to design reference signals for per-user elevation beamforming. The computer readable medium is tangibly encoded with a computer program executable by a processor to perform actions. The actions include receiving an indication of which RSs in a plurality of RSs sound in the elevation dimension and which RSs in the plurality of RSs sound in the azimuthal dimension. The actions include receiving the plurality of RSs from a transmit antenna array and separating the plurality of RSs into the first portion and the second portion based at least in part on the indication. The actions also include sending elevation feedback and azimuthal feedback to the access point.

In a further exemplary embodiment of the computer readable medium above, the indication includes at least one of: a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the computer readable media above, the first portion of the RSs contains RSs for the azimuthal dimension and second portion of the RSs contains RSs for the elevation dimension.

In a further exemplary embodiment of any one of the computer readable media above, the RSs are CSI-RSs.

In another exemplary embodiment of any one of the computer readable media above, receiving the plurality of RSs includes, for each RS of the plurality of RSs, performing measurements of the RS.

In a further exemplary embodiment of any one of the computer readable media above, receiving the plurality of RSs includes receiving a first subset of the RSs at a first time-frequency location; and receiving a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the computer readable media above, receiving the plurality of RSs includes receiving a first subset of the RSs on a first set of frequencies; and receiving a second subset of the RSs on a second set of frequencies. The first set of frequencies is different from the second set of frequencies.

In a further exemplary embodiment of any one of the computer readable media above, receiving the plurality of RSs includes receiving a first subset of the RSs at one time on one set of frequencies; and receiving a second subset of the RSs at the same time on the same set of frequencies. The first subset employs one sequence or spreading code and the second sequence employs a different sequence or spreading code.

In another exemplary embodiment of any one of the computer readable media above, separating the plurality of RSs is further based on the time the RS was received.

In a further exemplary embodiment of any one of the computer readable media above, the actions also include receiving an indication of a codebook. The elevation feedback and the azimuthal feedback is based on the codebook.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides a computer readable medium to design reference signals for per-user elevation beamforming. The computer readable medium is tangibly encoded with a computer program executable by a processor to perform actions. The actions include sending, from an access point, an indication of which RSs in a plurality of RSs sound in the elevation dimension and which RSs in the plurality of RSs sound in the azimuthal dimension. The actions include sending, from the access point, the plurality of RSs using a plurality of antenna and receiving elevation feedback and azimuthal feedback at the access point. The actions also include determining beamforming weights for the plurality of antenna based at least in part on the elevation feedback and the azimuthal feedback.

In a further exemplary embodiment of the computer readable medium above, the indication includes a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the computer readable media above, the RSs are CSI-RSs.

In a further exemplary embodiment of any one of the computer readable media above, sending the plurality of RSs includes sending a first subset of the RSs at a first time-frequency location; and sending a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the computer readable media above, sending the plurality of RSs includes sending a first subset of the RSs on a first set of frequencies; and sending a second subset of the RSs on a second set of frequencies. The first set of frequencies is different from the second set of frequencies.

In a further exemplary embodiment of any one of the computer readable media above, sending the plurality of RSs includes sending a first subset of the RSs at one time on one set of frequencies; and sending a second subset of the RSs at the same time on the same set of frequencies. The first subset employs one sequence or spreading code and the second sequence employs a different sequence or spreading code.

In another exemplary embodiment of any one of the computer readable media above, the actions also include sending an indication of a codebook. The elevation feedback and determining the azimuthal feedback are based on the codebook.

In a further exemplary embodiment of any one of the computer readable media above, the beamforming weights provide beamforming in at least elevation.

In another exemplary embodiment of any one of the computer readable media above, sending the plurality of RSs includes sending the RSs in the plurality of RSs which sound in the azimuthal dimension using a first portion of the plurality of antenna; and sending the RSs in the plurality of RSs which sound in the elevation dimension using a second portion of the plurality of antenna.

In a further exemplary embodiment of any one of the computer readable media above, the computer readable medium is a non-transitory computer readable medium (e.g., CD-ROM, RAM, flash memory, etc.).

In another exemplary embodiment of any one of the computer readable media above, the computer readable medium is a storage medium.

A further exemplary embodiment provides a computer readable medium to send reference signals for per-user elevation beamforming. The computer readable medium is tangibly encoded with a computer program executable by a processor to perform actions. The actions include sending, at a first time, RSs in a plurality of RSs which sound in an azimuthal dimension using a first portion of the plurality of antenna. The actions also include sending, at a second time, RSs in the plurality of RSs which sound in an elevation dimension using a second portion of the plurality of antenna.

In another exemplary embodiment of the computer readable medium above, sending the RSs which sound in the azimuthal dimension includes aggregating elevation antenna of the plurality of antenna. The elevation antenna may be aggregated using CSD.

In a further exemplary embodiment of any one of the computer readable media above, sending the RSs which sound in the elevation dimension includes aggregating azimuthal antenna of the plurality of antenna. The azimuthal antenna may be aggregated using cyclical shift diversity.

In another exemplary embodiment of any one of the computer readable media above, the computer readable medium is a non-transitory computer readable medium (e.g. CD-ROM, RAM, flash memory, etc.).

In a further exemplary embodiment of any one of the computer readable media above, the computer readable medium is a storage medium.

Another exemplary embodiment provides an apparatus to design reference signals for per-user elevation beamforming. The apparatus includes means for receiving (such as a receiver) an indication of which RSs in a plurality of RSs sound in the elevation dimension and which RSs in the plurality of RSs sound in the azimuthal dimension. The apparatus includes means for receiving (such as a receiver) the plurality of RSs from a transmit antenna array and means for separating (such as a processor) the plurality of RSs into the first portion and the second portion based at least in part on the indication. The apparatus also includes means for sending (such as a transmitter) elevation feedback and azimuthal feedback to the access point.

In a further exemplary embodiment of the apparatus above, the indication includes at least one of: a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the apparatus above, the first portion of the RSs contains RSs for the azimuthal dimension and second portion of the RSs contains RSs for the elevation dimension.

In a further exemplary embodiment of any one of the apparatus above, the RSs are CSI-RSs.

In another exemplary embodiment of any one of the apparatus above, receiving the plurality of RSs includes, for each RS of the plurality of RSs, performing measurements of the RS.

In a further exemplary embodiment of any one of the apparatus above, receiving the plurality of RSs includes receiving a first subset of the RSs at a first time-frequency location; and receiving a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the apparatus above, the receiving means includes means for receiving a first subset of the RSs on a first set of frequencies; and means for receiving a second subset of the RSs on a second set of frequencies. The first set of frequencies is different from the second set of frequencies.

In a further exemplary embodiment of any one of the apparatus above, the receiving means includes means for receiving a first subset of the RSs at one time on one set of frequencies; and means for receiving a second subset of the RSs at the same time on the same set of frequencies. The first subset employs one sequence or spreading code and the second sequence employs a different sequence or spreading code.

In another exemplary embodiment of any one of the apparatus above, separating the plurality of RSs is further based on the time the RS was received.

In a further exemplary embodiment of any one of the apparatus above, the apparatus also includes means for receiving an indication of a codebook. The elevation feedback and the azimuthal feedback is based on the codebook.

Another exemplary embodiment provides an apparatus to design reference signals for per-user elevation beamforming. The apparatus includes means for sending (such as a transmitter), from an access point, an indication of which RSs in a plurality of RSs sound in the elevation dimension and which RSs in the plurality of RSs sound in the azimuthal dimension. The apparatus includes means for sending (such as a transmitter), from the access point, the plurality of RSs using a plurality of antenna and means for receiving (such as a receiver) elevation feedback and azimuthal feedback at the access point. The apparatus also includes means for determining (such as a processor) beamforming weights for the plurality of antenna based at least in part on the elevation feedback and the azimuthal feedback.

In a further exemplary embodiment of any one of the apparatus above, the indication includes a total number of RSs in the first portion; a total number of RSs in the second portion; a location of the RSs in the first portion; a location of the RSs in the second portion; a structure of the RSs; and/or an indication of a number of azimuthal ports and a number of elevation ports.

In another exemplary embodiment of any one of the apparatus above, the RSs are CSI-RSs.

In a further exemplary embodiment of any one of the apparatus above, sending the plurality of RSs includes sending a first subset of the RSs at a first time-frequency location; and sending a second subset of the RSs at a second time-frequency location. The second time-frequency location may be the same as the first time-frequency location and the first subset of the RSs may be received on a first spreading code and the second subset of the RSs may be received on a second spreading code.

In a further exemplary embodiment of any one of the apparatus above, the sending means includes means for sending a first subset of the RSs on a first set of frequencies; and means for sending a second subset of the RSs on a second set of frequencies. The first set of frequencies is different from the second set of frequencies.

In a further exemplary embodiment of any one of the apparatus above, the sending means includes means for sending a first subset of the RSs at one time on one set of frequencies; and means for sending a second subset of the RSs at the same time on the same set of frequencies. The first subset employs one sequence or spreading code and the second sequence employs a different sequence or spreading code.

In another exemplary embodiment of any one of the apparatus above, the apparatus also includes means for sending an indication of a codebook. The elevation feedback and determining the azimuthal feedback are based on the codebook.

In a further exemplary embodiment of any one of the apparatus above, the beamforming weights provide beamforming in at least elevation.

In another exemplary embodiment of any one of the apparatus above, sending the plurality of RSs includes sending the RSs in the plurality of RSs which sound in the azimuthal dimension using a first portion of the plurality of antenna; and sending the RSs in the plurality of RSs which sound in the elevation dimension using a second portion of the plurality of antenna.

A further exemplary embodiment provides an apparatus to send reference signals for per-user elevation beamforming. The apparatus includes means for sending (such as a transmitter), at a first time, RSs in a plurality of RSs which sound in an azimuthal dimension using a first portion of the plurality of antenna. The apparatus also includes means for sending (such as a transmitter), at a second time. RSs in the plurality of RSs which sound in an elevation dimension using a second portion of the plurality of antenna.

In another exemplary embodiment of the apparatus above, the RSs which sound in the azimuthal dimension sending means includes means for aggregating elevation antenna of the plurality of antenna. The elevation antenna may be aggregated using CSD.

In a further exemplary embodiment of any one of the apparatus above, the RSs which sound in the elevation dimension sending means includes means for aggregating azimuthal antenna of the plurality of antenna. The azimuthal antenna may be aggregated using cyclical shift diversity.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Based on the foregoing it should be apparent that various exemplary embodiments provide a method, apparatus and computer program(s) that to relate to reference signal design for per-user elevation beamforming. Various non-limiting examples include:

Example 1

A method comprising: receiving an indication of which reference signals in a plurality of reference signals sound in the elevation dimension and which reference signals in the plurality of reference signals sound in the azimuthal dimension; receiving the plurality of reference signals from a transmit antenna array; separating the plurality of reference signals into a first portion and a second portion based at least in part on the indication; calculating elevation feedback and azimuth feedback based on the first and second portions; and sending elevation feedback and azimuthal feedback to the access point.

Example 2

The method of example 1, where the indication comprises at least one of: a total number of reference signals in the first portion; a total number of reference signals in the second portion; a location of the reference signals in the first portion; a location of the reference signals in the second portion; a structure of the reference signals; and an indication of a number of azimuthal ports and a number of elevation ports.

Example 3

The method of example 1 where the first portion of the reference signals contains reference signals for the azimuthal dimension and second portion of the reference signals contains reference signals for the elevation dimension.

Example 4

The method of example 1, where the reference signals are channel state information reference signals.

Example 5

The method of example 1, where receiving the plurality of reference signals comprises, for each reference signal of the plurality of reference signals, performing measurements of the reference signal.

Example 6

The method of example 1, where receiving the plurality of reference signals comprises: receiving a first subset of the reference signals at a first time-frequency location; and receiving a second subset of the reference signals at a second time-frequency location.

Example 7

The method of example 6, where the second time-frequency location is the same as the first time-frequency location and the first subset of the reference signals is received on a first spreading code and the second subset of the reference signals is received on a second spreading code.

Example 8

The method of example 1, where separating the plurality of reference signals is further based on the time the reference signal was received.

Example 9

A method comprising: sending, from an access point, an indication of which reference signals in a plurality of reference signals sound in the elevation dimension and which reference signals in the plurality of reference signals sound in the azimuthal dimension; sending, from the access point, the plurality of reference signals using a plurality of antenna; receiving elevation feedback and azimuthal feedback at the access point; and determining beamforming weights for the plurality of antenna based at least in part on the elevation feedback and the azimuthal feedback.

Example 10

The method of example 9, where the indication comprises at least one of: a total number of reference signals in the first portion; a total number of reference signals in the second portion; a location of the reference signals in the first portion; a location of the reference signals in the second portion; a structure of the reference signals; and an indication of a number of azimuthal ports and a number of elevation ports.

Example 11

The method of example 9, where the reference signals are channel state information reference signals.

Example 12

The method of example 9, where sending the plurality of reference signals comprises: sending a first subset of the reference signals at a first time-frequency location; and sending a second subset of the reference signals at a second time-frequency location.

Example 13

The method of example 12, where the second time-frequency location is the same as the first time-frequency location and the first subset of the reference signals is sent on a first spreading code and the second subset of the reference signals is sent on a second spreading code.

Example 14

The method of example 9, further comprising sending an indication of a codebook, where the elevation feedback and determining the azimuthal feedback are based on the codebook.

Example 15

The method of example 9, where the beamforming weights provide beamforming in at least elevation.

Example 16

The method of example 9, where sending the plurality of reference signals comprises: sending the reference signals in the plurality of reference signals which sound in the azimuthal dimension using a first portion of the plurality of antenna; and sending the reference signals in the plurality of reference signals which sound in the elevation dimension using a second portion of the plurality of antenna.

Example 17

An apparatus, comprising at least one processor; and at least one memory including computer program code, the at least one memory and the computer program code configured to, with the at least one processor, cause the apparatus to perform at least the following: to receive an indication of which reference signals in a plurality of reference signals sound in the elevation dimension and which reference signals in the plurality of reference signals sound in the azimuthal dimension; to receive the plurality of reference signals from a transmit antenna array; to separate the plurality of reference signals into a first portion and a second portion based at least in part on the indication; to calculate elevation feedback and azimuth feedback based on the first and second portions; and to send elevation feedback and azimuthal feedback to the access point.

Example 18

The apparatus of example 17, where, when receiving the plurality of reference signals, the at least one memory and the computer program code are further configured to cause the apparatus: to receive a first subset of the reference signals at a first time-frequency location; and to receive a second subset of the reference signals at a second time-frequency location.

Example 19

An apparatus comprising: sending, from an access point, an indication of which reference signals in a plurality of reference signals sound in the elevation dimension and which reference signals in the plurality of reference signals sound in the azimuthal dimension; sending, from the access point, the plurality of reference signals using a plurality of antenna; receiving elevation feedback and azimuthal feedback at the access point; and determining beamforming weights for the plurality of antenna based at least in part on the elevation feedback and the azimuthal feedback.

Example 20

The apparatus of example 19, where, when sending the plurality of reference signals, the at least one memory and the computer program code are further configured to cause the apparatus: to send a first subset of the reference signals at a first time-frequency location; and to send a second subset of the reference signals at a second time-frequency location.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving an indication of which reference signals in a plurality of reference signals sound in the elevation dimension and which reference signals in the plurality of reference signals sound in the azimuthal dimension;
   receiving the plurality of reference signals from a transmit antenna array;
   separating the plurality of reference signals into a first portion and a second portion based at least in part on the indication;
   calculating elevation feedback and azimuth feedback based on the first and second portions; and
   sending the elevation feedback and the azimuthal feedback to the access point.

2. The method of claim 1, where the indication comprises at least one of: a total number of reference signals in the first portion; a total number of reference signals in the second portion; a location of the reference signals in the first portion; a location of the reference signals in the second portion; a structure of the reference signals; and an indication of a number of azimuthal ports and a number of elevation ports.

3. The method of claim 1, where the first portion of the reference signals contains reference signals for the azimuthal dimension and second portion of the reference signals contains reference signals for the elevation dimension.

4. The method of claim 1, where the reference signals are channel state information reference signals.

5. The method of claim 1, where receiving the plurality of reference signals comprises, for each reference signal of the plurality of reference signals, performing measurements of the reference signal.

6. The method of claim 1, where receiving the plurality of reference signals comprises:
   receiving a first subset of the reference signals at a first time-frequency location; and
   receiving a second subset of the reference signals at a second time-frequency location.

7. The method of claim 6, where the second time-frequency location is the same as the first time-frequency location and the first subset of the reference signals is received on a first spreading code and the second subset of the reference signals is received on a second spreading code.

8. The method of claim 1, where separating the plurality of reference signals is further based on the time the reference signal was received.

9. A method comprising:
   sending, from an access point, an indication of which reference signals in a plurality of reference signals sound in the elevation dimension and which reference signals in the plurality of reference signals sound in the azimuthal dimension;
   sending, from the access point, the plurality of reference signals using a plurality of antenna;
   receiving elevation feedback and azimuthal feedback at the access point; and
   determining beamforming weights for the plurality of antenna based at least in part on the elevation feedback and the azimuthal feedback.

10. The method of claim 9, where the indication comprises at least one of: a total number of reference signals in the first portion; a total number of reference signals in the second portion; a location of the reference signals in the first portion; a location of the reference signals in the second portion; a structure of the reference signals; and an indication of a number of azimuthal ports and a number of elevation ports.

11. The method of claim 9, where the reference signals are channel state information reference signals.

12. The method of claim 9, where sending the plurality of reference signals comprises:
   sending a first subset of the reference signals at a first time-frequency location; and
   sending a second subset of the reference signals at a second time-frequency location.

13. The method of claim 12, where the second time-frequency location is the same as the first time-frequency location and the first subset of the reference signals is sent on a first spreading code and the second subset of the reference signals is sent on a second spreading code.

14. The method of claim 9, further comprising sending an indication of a codebook, where the elevation feedback and determining the azimuthal feedback are based on the codebook.

15. The method of claim 9, where the beamforming weights provide beamforming in at least elevation.

16. The method of claim 9, where sending the plurality of reference signals comprises:
   sending the reference signals in the plurality of reference signals which sound in the azimuthal dimension using a first portion of the plurality of antenna; and
   sending the reference signals in the plurality of reference signals which sound in the elevation dimension using a second portion of the plurality of antenna.

17. An apparatus, comprising at least one processor; and at least one memory including computer program code, the at least one memory and the computer program code configured to, with the at least one processor, cause the apparatus to perform at least the following:
   to receive an indication of which reference signals in a plurality of reference signals sound in the elevation dimension and which reference signals in the plurality of reference signals sound in the azimuthal dimension;
   to receive the plurality of reference signals from a transmit antenna array;
   to separate the plurality of reference signals into a first portion and a second portion based at least in part on the indication;
   to calculate elevation feedback and azimuth feedback based on the first and second portions; and
   to send the elevation feedback and the azimuthal feedback to the access point.

18. The apparatus of claim 17, where, when receiving the plurality of reference signals the at least one memory and the computer program code are further configured to cause the apparatus:
   to receive a first subset of the reference signals at a first time-frequency location; and
   to receive a second subset of the reference signals at a second time-frequency location.

19. An apparatus, comprising at least one processor; and at least one memory including computer program code, the at least one memory and the computer program code configured to, with the at least one processor, cause the apparatus to perform at least the following:
   to send, from an access point, an indication of which reference signals in a plurality of reference signals sound in the elevation dimension and which reference signals in the plurality of reference signals sound in the azimuthal dimension;
   to send, from the access point, the plurality of reference signals using a plurality of antenna;
   to receive elevation feedback and azimuthal feedback at the access point; and
   to determine beamforming weights for the plurality of antenna based at least in part on the elevation feedback and the azimuthal feedback.

20. The apparatus of claim 19, where, when sending the plurality of reference signals, the at least one memory and the computer program code are further configured to cause the apparatus:
   to send a first subset of the reference signals at a first time-frequency location; and
   to send a second subset of the reference signals at a second time-frequency location.

* * * * *